United States Patent
Boon

(10) Patent No.: US 6,687,408 B2
(45) Date of Patent: Feb. 3, 2004

(54) OBJECT-BASED DIGITAL IMAGE PREDICTIVE CODING TRANSFER METHOD AND APPARATUS

(75) Inventor: Choong Seng Boon, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/387,566

(22) Filed: Mar. 14, 2003

(65) Prior Publication Data

US 2003/0165271 A1 Sep. 4, 2003

Related U.S. Application Data

(62) Division of application No. 10/268,902, filed on Oct. 11, 2002, now Pat. No. 6,560,364, which is a division of application No. 09/566,626, filed on May 8, 2000, now Pat. No. 6,510,249, which is a division of application No. 09/015,055, filed on Jan. 28, 1998, now Pat. No. 6,167,158, which is a division of application No. 08/575,870, filed on Dec. 20, 1995, now Pat. No. 5,767,911.

(30) Foreign Application Priority Data

Dec. 20, 1994 (JP) .............................................. 6-316623
Feb. 10, 1995 (JP) .............................................. 7-22755

(51) Int. Cl.[7] .................................................. G06K 9/36
(52) U.S. Cl. ........................................................ 382/238
(58) Field of Search .............................. 382/232, 233, 382/236, 238, 239, 243, 248, 250; 358/426, 427, 433, 448, 453; 348/400.1–401.1, 408.1–412.1, 415.1, 576, 577, 578, 580, 581, 582, 586; 375/240.12–240.16, 240.18–240.2

(56) References Cited

U.S. PATENT DOCUMENTS 4,463,380 A    7/1984  Hooks, Jr.
5,157,742 A   10/1992  Niihara
5,193,004 A    3/1993  Wang et al.
5,260,783 A   11/1993  Dixit
5,274,453 A   12/1993  Maeda (List continued on next page.)

FOREIGN PATENT DOCUMENTS

| EP | 0 395 440 | 10/1990 |
| EP | 0 402 954 | 12/1990 |
| EP | 0 606 675 | 7/1994 |
| EP | 0 614 318 | 9/1994 |
| EP | 0 707 427 | 4/1996 |
| WO | 94/11993 | 5/1994 |
| WO | 94/28507 | 12/1994 |

OTHER PUBLICATIONS

"An Image Coding Scheme Using Layered Representation and Multiple Templates", Technical Report of IBICE. (The Institute of Electronics, Information and Communication Engineers) IE94–159, PRU94–159 (Mar. 1995).

(List continued on next page.)

*Primary Examiner*—Jose L. Couso
(74) *Attorney, Agent, or Firm*—Wenderoth, Lind & Ponack, L.L.P.

(57) ABSTRACT

The optimum predictive image is selected as follows for the entire area of an image sequence comprising a luminance signal expressing each pixel value, and a transmittance signal expressing the transparency of each pixel value, and described by the transmittance signal of the target image to be coded as the area to be coded. The target image to be coded is predicted from at least one template typical of the image sequence, thereby generating a first predictive image. The target image to be coded is also predicted from the image displayed chronologically before the target image, thereby generating a second predictive image. It is then determined whether the first or the second predictive image has the least difference to the target image to be coded, and the predictive image with the least difference is selected as the optimum predictive image.

5 Claims, 19 Drawing Sheets

U.S. PATENT DOCUMENTS

| | | | |
|---|---|---|---|
| 5,353,063 A | | 10/1994 | Yagisawa et al. |
| 5,408,274 A | | 4/1995 | Chang et al. |
| 5,412,431 A | | 5/1995 | Vogel |
| 5,534,927 A | | 7/1996 | Shishikui |
| 5,576,767 A | | 11/1996 | Lee et al. |
| 5,592,228 A | | 1/1997 | Dachiku et al. |
| 5,598,215 A | | 1/1997 | Watanabe |
| 5,748,789 A | | 5/1998 | Lee et al. |
| 5,757,971 A | | 5/1998 | Kim |
| 5,764,805 A | | 6/1998 | Martucci et al. |
| 5,767,911 A | * | 6/1998 | Boon .................... 375/240.12 |
| 5,768,438 A | | 6/1998 | Etoh |
| 5,799,111 A | | 8/1998 | Guissin |
| 5,883,977 A | | 3/1999 | Kim |
| 5,915,046 A | | 6/1999 | Echigo et al. |
| 5,991,447 A | | 11/1999 | Eifrig et al. |
| 6,014,173 A | | 1/2000 | Miyamoto |
| 6,049,628 A | | 4/2000 | Chen et al. |
| 6,061,474 A | | 5/2000 | Kajiwara et al. |
| 6,078,694 A | | 6/2000 | Takahashi et al. |
| 6,167,158 A | * | 12/2000 | Boon ......................... 382/238 |
| 6,510,249 B1 | * | 1/2003 | Boon ......................... 382/238 |
| 6,560,364 B2 | * | 5/2003 | Boon ......................... 382/232 |

OTHER PUBLICATIONS

"Layered Representation for Motion and Analysis", Johnn Y.A. Wang, Proc Computer Vision and Pattern Recognition, 1993.

"Layered Representation for Image Sequence Coding", Wang et al., Proc. IEEE Int. Conf. Acoustic Speech Signal Processing, 1993.

John Y.A. Wang et al., "Representing Moving Images with Layers", IEEE Transactions On Image Processing vol. 3, No. 5, pp. 625–638, Sep. 1, 1994.

John Y.A. Wang et al., "Applying Mid–level Vision Techniques for Video Data Compression and Manipulation", p. 121, lines 13–33, Figs. 6A–6C.

Chang S–F et al. "Transform Coding of Arbitrarily–Shaped Image Segments" Proceedings of First ACM International Conference on Multimedia, Aug. 2–6, 1993, Anaheim, CA, US, New York, NY, US, pp. 83–90, XP000607524.

Mussman, H.G. "Object–oriented analysis–synthesis coding based on source models of moveing 2D– and 3D–objects" Statistical Signal and Array Processing, Minneapolis, Apr. 27–30, 1993, Proceedings of the International Conference on Acoustics, Speech, and Signal Proceeding (ICASSP), New York, IEEE, US, vol. 4, pp. 99–102, XP010110305.

* cited by examiner

|  | Frame 1 | | Frame 2 | | | Frame 3 | | | Frame 4 | | |
|---|---|---|---|---|---|---|---|---|---|---|---|
|  | C1 | B1 | A1 | C2 | B2 | A2 | C3 | B3 | A3 | C4 | B4 | A4 |
| SW26 | ON | ON | ON | ON | OFF | ON | OFF | ON | OFF | OFF | ON | OFF |
| SW34 | ON | ON | ON | ON | OFF | ON | OFF | ON | OFF | OFF | ON | OFF |
| SW30 | OFF | OFF | ON | OFF | OFF | OFF | OFF | OFF | OFF | OFF | OFF | OFF |
| FM1 | C1 | B1+C1 | A1+B1+C1 | C2 | C2 | A2+C2 | A2+C2 | A2+C2 | A2+C2 | A2+C2 | A2+C2 | A2+C2 |
| DFM | A0+B0+C0 | A0+B0+C0 | A1+B1+C1 | A1+B1+C1 | A1+B1+C1 | A1+B1+C1 | A1+B1+C1 | B3+A2+C2 | B3+A2+C2 | B3+A2+C2 | B4+A2+C2 | B4+A2+C2 |

Fig. 19

| | Frame 1 | | | Frame 2 | | | | Frame 3 | | | |
|---|---|---|---|---|---|---|---|---|---|---|---|
| | C1 | B1 | A1 | C2 | B2 | A2 | | C3 | B3 | A3 | |
| SW26 | ON | ON | ON | ON | ON | ON | — | ON | ON | ON | — |
| SW38 | P40 | P40 | P40 | P40 | P40 | P40 | P39 | P40 | P40 | P40 | P39 |
| SW34 | P29 | P29 | P29 | P29 | P27 | P29 | P29 | P29 | P27 | P29 | P29 |
| SW31 | P35 | P35 | P35 | P35 | P33 | P35 | P35 | P35 | P33 | P35 | P35 |
| SW30 | OFF | OFF | ON | OFF | OFF | OFF | ON | OFF | OFF | OFF | ON |
| FM1 | C1 | B1+C1 | A1+B1+C1 | C2 | C2 | A2+C2 | B2+A2+C2 | C3 | C3 | A3+C3 | B3+A3+C3 |
| FM2 | — | — | — | — | B2 | B2 | B2 | B2 | B3 | B3 | B3 |
| DFM | A0+B0+C0 | A0+B0+C0 | A1+B1+C1 | A1+B1+C1 | A1+B1+C1 | A1+B1+C1 | B2+A2+C2 | B2+A2+C2 | B2+A2+C2 | B2+A2+C2 | B3+A3+C3 |

OBJECT-BASED DIGITAL IMAGE PREDICTIVE CODING TRANSFER METHOD AND APPARATUS

This is a divisional application of Ser. No. 10/268,902, filed Oct. 11, 2002 now U.S. Pat. No. 6,560,364, which is a divisional application of Ser. No. 09/566,626 filed May 8, 2000, now U.S. Pat. No. 6,510,249, which is a divisional application of Ser. No. 09/015,055, filed Jan. 28, 1998, now U.S. Pat. No. 6,167,158, which is a divisional application of Ser. No. 08/575,870, filed Dec. 20, 1995, now U.S. Pat. No. 5,767,911.

BACKGROUND OF THE INVENTION

1. Field of the Invention

The present invention relates to a method and apparatus for predictive coding, storage, and transfer of digital images, and to an apparatus for signal decoding and image synthesizing, and relates particularly to a method and apparatus for predictive coding, storage, and transfer of digital images obtained by synthesizing plural object-based image layers, and to an apparatus for signal decoding and resynthesizing said object-based images.

2. Description of the Prior Art

J. Wang and E. Adelson have proposed a method for decomposing moving images into object-based layers (a different layer for each object in the image) for coding as a means of efficiently transmitting and recording moving images. Their method is described in "Layered Representation of Image Sequence Coding," J. Wang and E. Adelson, Proc. IEEE Int. Conf. Acoustic Speech Signal Processing, 1993, pp. V221–V224; and in "Layered Representation for Motion Analysis," J. Wang and E. Adelson, Proc. Computer Vision and Pattern Recognition, pp. 361–366, 1993.

This method is described below, assuming a motion picture containing fish, seaweed, and background. After each of the three elements composing this motion picture is separately recorded as a chromakey image, the elements can be synthesized into a single composite image, or a sequence of plural image frames bracketing a particular image can be analyzed and separated into the three component parts. The method proposed by Wang et al., analyzes the motion picture sequence to extract the fish, seaweed, and background, and separate each of these objects to a discrete layer. Each layer is then separately compression coded. The coded data is then multiplexed by a multiplexer, adding information identifying the vertical relationship between the layers (i.e., which layer overlays which layer), for storage or transmission. When it is also necessary to identify the relative transparency of the pixels or shapes in each frame is layer, a transmittance signal is also coded and transmitted or stored with the object layers.

Plural decoders are similarly required on the reproduction side. The multiplexed data is first demultiplexed into the separate layers, and the data in the separate layers is then simultaneously decoded by the respective decoders. The objects in the reproduced layers are then overlaid by the image synthesizer based on the vertical layer relationship data to generate the reproduction (synthesized) image then displayed on the display apparatus.

To improve the compression efficiency, an image representative of each layer (e.g., the fish, seaweed, or background scene) is determined and used as a reference image for that layer. Note that the template for each layer is selected to be most representative of the object sequence in that layer. These templates may be selected manually or automatically, and Wang et al., also describe a method for automatically generating these templates.

The defined templates are compression coded first, and each object in the layer is coded by predictive approximation based on the displacement or deformation of the generated template. By separating the motion picture into component objects, those objects can be more accurately approximated without being influenced by other nearby objects. Objects at a sufficient distance from the camera can also be treated as still objects, making it possible to describe the deformation and displacement (change and movement) in such objects with few parameters. More specifically, an affine transformation is used to approximate a single object using six parameters, thereby requiring few bits and achieving an extremely high compression rate.

The method approximating objects using templates as described above, however, results in increased error when there is a large change in object shape or luminance, and degrades the compression coding efficiency. In addition to approximation using templates, it is therefore necessary to predict such changes using the images displayed chronologically before and after the image to be coded, and to adaptively select the optimum predictive image.

Discrete predictive coding of each object also commonly results in a mismatch between the contours of the coded object and the predictive object. Contour mismatches increase the difference value, and prevent the efficient coding of the contour luminance and color difference signals.

Furthermore, the reproduction side must have three decoders to decode the objects in three layers as described above. As a result, the number of reproducible layers is limited by the number of decoders available to the reproduction side. A frame memory with sufficient capacity to store the decoder output is also needed to synthesize the reproduced objects in each layer, and the number of frame memory units is proportional to the number of layers. As the number of image layers increases, the overall size and cost of the decoder increase greatly.

Synthesis of the output image according to the vertical relationship data of the layers also prevents selective display of the layers, and prevents a selected layer from being moved from the coded position to a position behind or in front of another layer. More specifically, interactivity is impaired.

SUMMARY OF THE INVENTION

Therefore, an object of the present invention is to prevent deterioration of the predictive image as a result of large changes in the shape or luminance of an object in a predictive coding method using templates, and to reduce the accumulation of prediction error over time.

To achieve this, the present invention converts the image to be coded using a particular transformation method to generate predictive images from at least one template and the image displayed chronologically before or after the image to be coded, and uses the predictive image with the least difference to the image to be coded as the optimum predictive image for that image.

In addition, a new predictive image generated by averaging plural predictive images is added to the candidate predictive images from which the predictive image with the least difference is selected as the optimum predictive image for the image to be coded.

Furthermore, the optimum predictive image is divided into plural predictive subareas, that is, the image to be coded is divided into plural target subareas. For each target subarea in which there is at least one pixel value that should not be coded and the corresponding predictive subarea, the pixel values to be coded in the corresponding predictive subarea are then operated on using a known function to calculate a substitute pixel value, and this substitute pixel value is then substituted into the target subarea and corresponding predictive subarea for the pixel values therein that should not be coded. The difference signal is then obtained from the target and predictive subareas containing the substitute pixel value.

The second object of the present invention is to suppress an increase in the difference value caused by a mismatch between the contours of the target object to be coded and the predictive object.

To achieve this object, the predictive image and the target image to be coded are divided into plural predictive subareas and target subareas, respectively. Before the difference between corresponding predictive and target subareas is obtained, the pixel values to be coded in the predictive subarea are operated on using a known function to calculate a substitute pixel value for the corresponding target subarea in which there is at least one pixel value that should not be coded. This calculated substitute pixel value is then substituted into the target subarea and the corresponding predictive subarea for each pixel value therein not to be coded. The difference between the target subarea and predictive subarea is then calculated after making this pixel value substitution.

The third object of the present invention is to achieve a system whereby an image can be reproduced by means of a single decoder irrespective of the number of object layers composing the image, the image can be synthesized using a frame memory that is not dependent upon the number of object layers, and layers can be selectively reproduced, thus enabling high interactivity with the user.

The present invention uses an apparatus for decoding and synthesizing digital images composed of plural superimposed image layers where said digital images are coded by separately compression coding each of the plural image layers, and then multiplexing the layers in a predetermined order. Preferably, this coded data is multiplexed in sequence from either the background layer or the foreground layer.

Said decoding and synthesizing apparatus according to the present invention comprises an external line input terminal, decoder, synthesizer, frame memory, and output means. The coded data is input to the external line input terminal, and each layer is then decoded to a reconstructed image in the sequence in which the coded data was multiplexed. This reconstructed image and the synthesized image supplied from the frame memory are input to the synthesizer, which generates a new synthesized image by merging the synthesized image and the reconstructed image. This new synthesized image is stored to the frame memory, and displayed by the output means.

A first selector switch is also disposed between the external line input terminal and the decoder of the above decoding and synthesizing apparatus, and is controlled to not connect the external line input terminal and decoder when the image of a layer that is not reproduced is input. In addition to the first selector switch, a second selector switch is disposed between the synthesizer and frame memory, and is controlled to not connect the synthesizer and frame memory when the image stored in the frame memory is not to be updated.

BRIEF DESCRIPTION OF THE DRAWINGS

The present invention will become more fully understood from the detailed description given below and the accompanying diagrams wherein:

FIGS. 9A, 9B and 9C are diagrams showing the effect of difference value reduction by pixel value substitution according to the third embodiment of the present invention;

FIG. 18 shows a table representing the operation of the digital image decoding and synthesizing apparatus of FIG. 14; and FIG. 19 shows a table representing the operation of the digital image decoding and synthesizing apparatus of FIG. 15.

DESCRIPTION OF PREFERRED EMBODIMENTS

The input image processed by the present invention comprises objects in plural layers where the objects in each layer are defined by a luminance signal expressing the pixel value, and a transmittance signal expressing the transparency state of each pixel value. This is also the case when a color difference signal is also present in addition to the luminance signal; note that discussion of the color difference signal is omitted in the following description. Furthermore, unless otherwise stated, image objects as referred to herein are composed of a luminance signal and transmittance signal, and the pixel values used herein refer to the value of the luminance signal.

Figure 2:
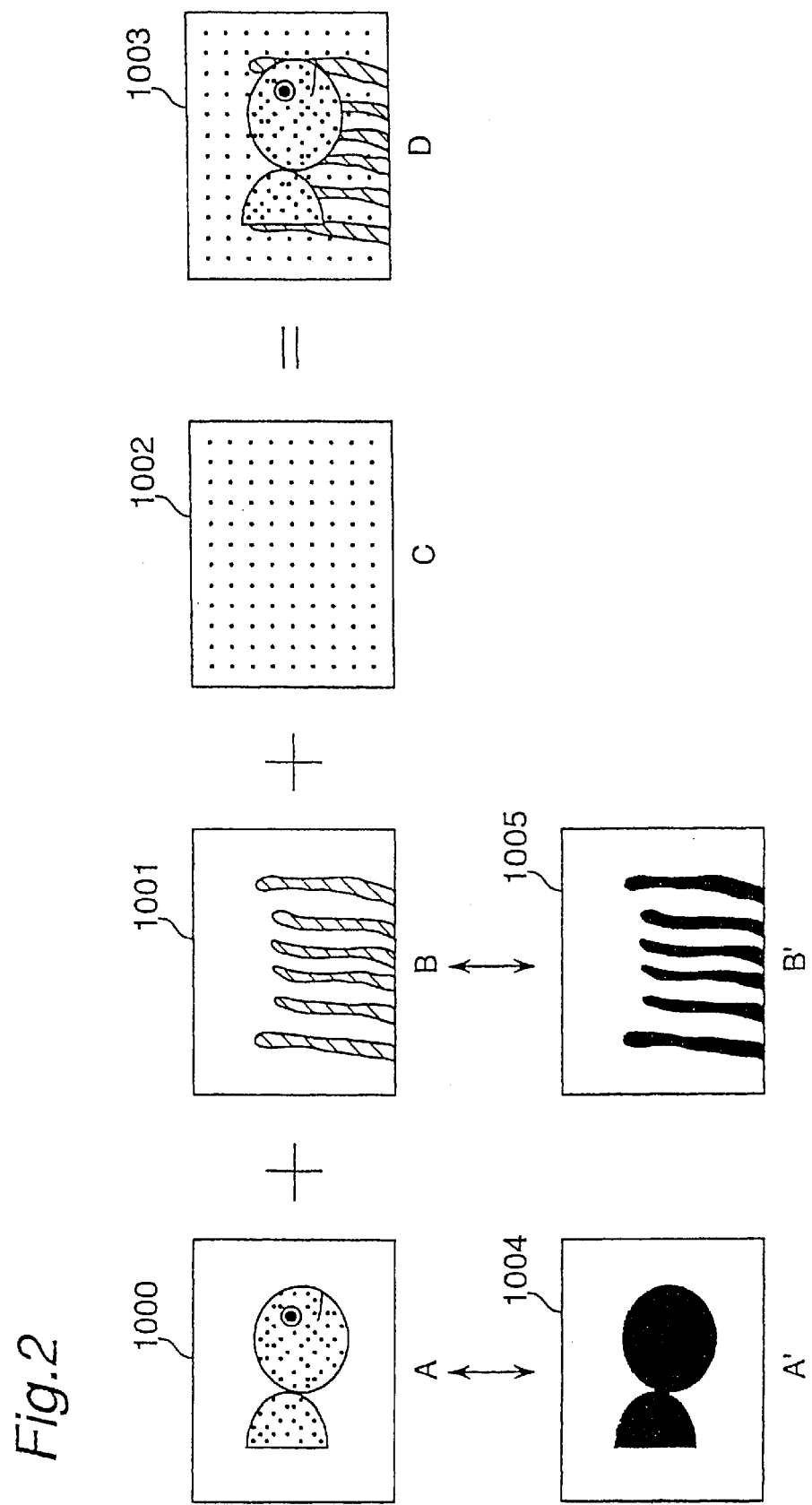
FIG. 2 is a diagram of a pictorial image showing an image synthesized by overlaying plural image layers.

FIG. 2 shows the luminance signal of one image D 1003 in a motion picture of plural frames, and the luminance signals of the three components combined to form the luminance signal of image D 1003. The three component images of image D 1003 (fish A 1000, seaweed B 1001, and background C 1002) can be separately recorded as chromakey images, and then combined to form image D 1003; or image D 1003 and an image sequence of plural frames before and after image D 1003 can be analyzed to separate image D 1003 into the three image components. These three image components are referred to as "slayers" herein. Thus, the image sequence containing image D 1003 has three layers, the layer of fish A 1000, the layer of seaweed B 1001, and the background C 1002 layer. The number of layers will depend upon the image.

A transmittance signal indicating the ratio at which the pixels should be overlaid is added to the objects in each layer. When the transmittance is 100%, an opaque object is present and the background cannot be seen; at 0% transmittance, there is no object present and the background can be viewed with nothing in front. Transmittance levels between 0% and 100% occur when there is a semitransparent object present, such as glass, and at object boundaries. The transmittance signals for fish A 1000 and seaweed B 1001 in FIG. 2 are shown as images A' and B', respectively. It should be noted that this transmittance signal describes the shape of the object.

Figure 1:
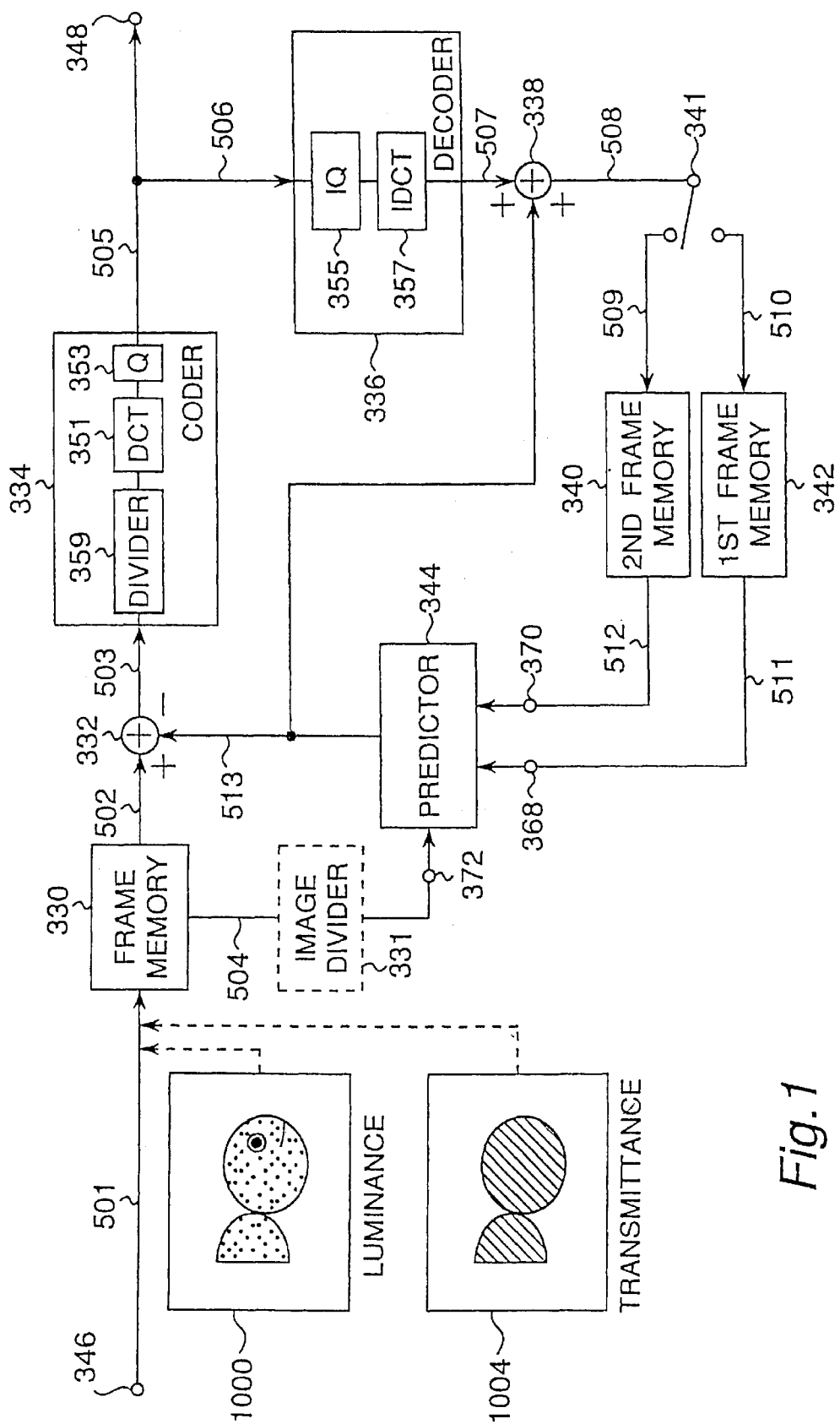
FIG. 1 is a block diagram of an image predictive coding apparatus according to a first embodiment of the present invention.

As shown in FIG. 1, luminance signal 1000 and transmittance signal 1004 are input from the input terminal 346, and stored to the input frame memory 330. The luminance signal and transmittance signal from the input frame memory 330 are input to the predictor 344 through line 504 simultaneously with the image stored in the first frame memory 342 and the image stored in the second frame memory 340. (An image divider 331 is shown for the purpose of modification, and is not provided in this embodiment.) A template previously coded and reproduced is stored to a first frame memory 342, and an image (i.e., not a template) previously coded and reproduced is stored to a second frame memory 340. The predictor 344 generates the optimum predictive image from the images input thereto. Adder 332 then obtains the difference image from the input image stored in the input frame memory 330, and the predictive image output from the predictor 344; the resulting difference image is then coded by the coder 334.

The coder 334 then divides the difference image into blocks using an image divider 359. It is to be noted that while blocks of 16×16 pixels or 8×8 pixels are preferable, the image divider 359 can divide one frame image into blocks of any particular shape and size. Each block is then converted by a discrete cosine transformation (DCT) operator 351 or other orthogonal transformation operation, and quantized by a quantizer 353. The quantized image is then output from the output terminal 348, and inverse quantized by an inverse quantizer 355 and inverse DCT converted by an inverse DCT 357 in a local decoder 336.

The reverted difference image is then added to the predictive image by an adder 338 to generate the reconstructed image stored to a second frame memory 340. It should be noted that both the luminance signal and the transmittance signal are coded. Furthermore, while the transmittance signal is DCT converted identically to the luminance signal in this example, a different compression method may be used. The coder 334 may also apply wavelet conversion or vector quantization in place of DCT conversion insofar as the reversion process executed by the local decoder 336 corresponds to the conversion process used by the coder 334.

The image used as the template is the image most closely resembling all images in the continuous image sequence, and can be selected either manually or automatically. Plural templates may also be selected for a single image sequence. Each template is also expressed by a luminance signal and transmittance signal, compression coded before transmission, and the reproduced template is then stored to the first frame memory 342. The reproduced template stored to the first frame memory 342 is also updated at either regular or irregular intervals. It is also noted that the template can be a complete image, or may comprise only a part of the complete image (e.g., an ear, eye, or mouth). It is also not necessary to transmit the template, in which case an image previously stored in the transmitter and receiver may be used as the template.

Figure 5:
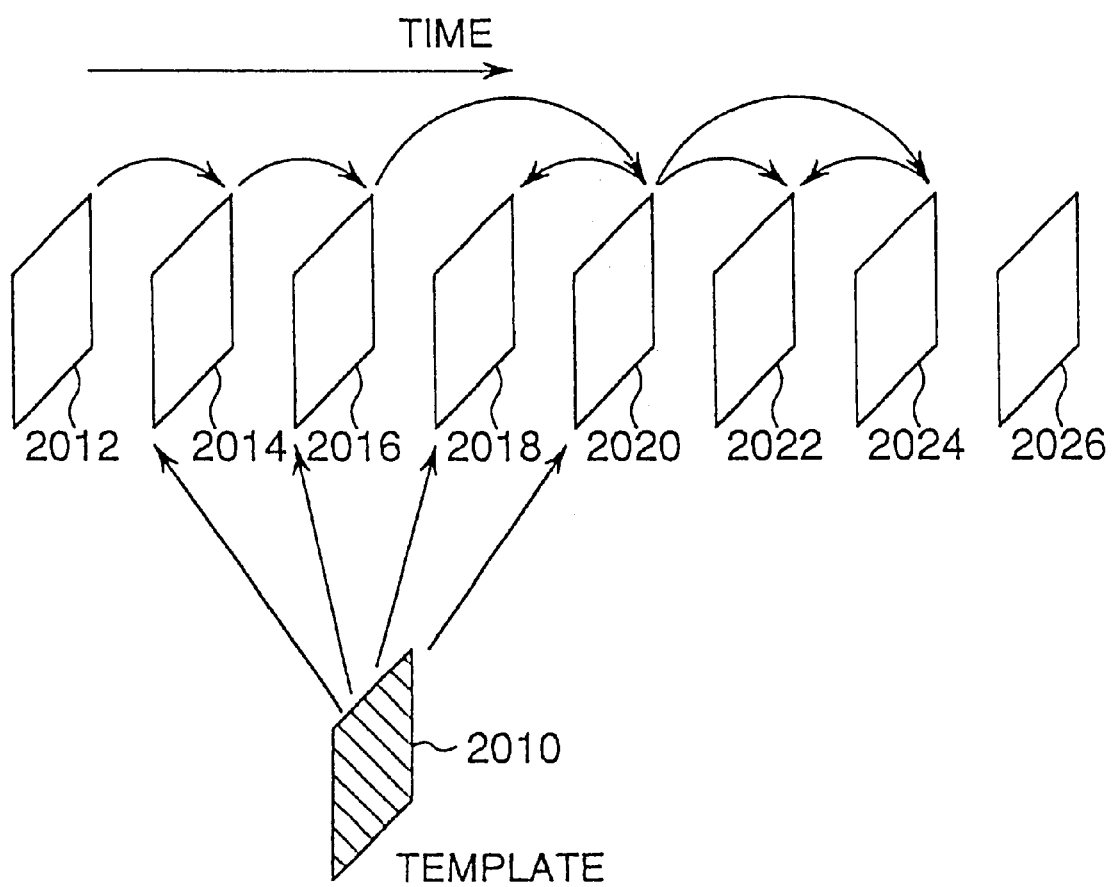
FIG. 5 is a diagram showing a pictorial image of the predictive method of the present invention.

The operation of the predictor 344 is described next with reference to FIGS. 3 and 5 for the case in which frame 2014 in FIG. 5 is predicted. FIG. 5 shows a simulation of the image predictive coding method. Note that frame 2014 is the target image, i.e., the image frame to be coded, frame 2010 is the template, and frame 2012 is the image frame displayed chronologically before the target image 2014. Each of these images 2010, 2012, and 2014 is input to the predictor 344 shown in FIG. 3, specifically inputting target image 2014, i.e., the luminance signal and transmittance signal thereof, to terminal 372, the template 2010 to terminal 368, and the "previous" frame 2012 to terminal 370. Note that the "previous" frame 2012 is the decompressed, reconstructed image stored to the second frame memory 340 in FIG. 1, and the template 2010 is the similarly decompressed, reconstructed image stored to the first frame memory 342 in FIG. 1.

The target image 2014 and template 2010 are then input to a deformation and displacement calculator 350, which obtains the deformation and displacement parameters, such as shift amount data, rotation degree data, contraction data, expansion data, curve data, etc. More specifically, in the deformation and displacement calculator 350, by comparing the template 2010 and the target image 2014, various parameters are produced that represent amount of change from the template 2010 to the target image 2014. For example, if the target image 2014 is shifted by a vector A and rotated by a degree θ from the template 2010, parameters A and θ are produced from the deformation and displacement calculator 350. An affine transformation is preferably used in the deformation and displacement calculator 350 to obtain the deformation and displacement parameters, but a transformation containing a term of the second degree may be alternatively used. The parameters, i.e., affine coefficients, obtained by the deformation and displacement calculator 350 are input together with the template 2010 to a predictive image generator 352.

In the predictive image generator 352, a quasi target image (this may not be exactly the same as the target image 2014 applied to the terminal 372) is reformed using the template 2010 and the parameters. The quasi target image, which is referred to as a first predictive image (luminance and transmittance signals) is generated by means of an affine transformation. The structure and operation of the deformation and displacement calculator 350 and predictive image generator 352 are described in. "An Image Coding Scheme Using Layered Representation and Multiple Templates," M.

Etoh, et al., Technical report of IEICE, IE94-159, PRU94-159, 1995; "Layered Representation of Image Sequence Coding," J. Wang and E. Adelson, Proc. IEEE Int. Conf. Acoustic Speech Signal Processing, 1993, pp. V221–V224; and in "Layered Representation for Motion Analysis," J. Wang and E. Adelson, Proc. Computer Vision and Pattern Recognition, pp. 361–366, 1993, which are incorporated herein by reference.

This first predictive image and the target image are then input to the difference calculator 354, which obtains a first square difference sum by the following equation (1):

$$\sum_{i,j=0}^{image} (T_{ij} - Q_{ij})^2 \quad (1)$$

in which $T_{ij}$ is a pixel value at position (i,j) in the target image 2014, $Q_{ij}$ is a pixel value at position (i,j) in the first predictive image (quasi target image), and "image" is a portion of the frame where the pixel values are to be coded or can be a complete one frame. The calculated sum is applied to the comparator 366.

The affine coefficient of the target image 2014 based on the "previous" frame 2012 is likewise obtained by the corresponding deformation and displacement calculator 356, and a second predictive image (quasi target image) is generated based on the "previous" frame 2012 by the corresponding predictive image generator 358. A difference calculator 360 calculates the difference between the target image 2014 and the second predictive image from the predictive image generator 358 and produces a second square difference sum using equation (1). The difference sum is output to the comparator 366.

The first and second predictive images are also input to an average calculator 362 to calculate a weighted averages of the respective luminance and transmittance signals between the first and second predictive images. Thus, the average calculator generates an average or a third predictive image. The difference calculator 364 then calculates a third square difference sum from this third predictive image and the target image, and outputs the result to the comparator 366.

The comparator 366 thus compares the first, second and third square difference sums, detects the lowest sum, and controls the switches 376 and 376' to output the predictive image and its affine coefficients corresponding to the lowest difference value. More specifically, if the difference between the first predictive image and the target image is smallest; i.e., is smaller than that between the second predictive image and the target image or smaller than that between the third predictive image and the target image, the switch 376 is connected to pole 382 to output the first predictive image from terminal 374 and the switch 376' is connected to pole 382' to output the affine coefficients pertaining to the first predictive image, that is, switches 376 and 376' produce a first data. The smallest difference is selected because the predicted image with the smallest difference is closest to the target image 2014.

Similarly, if the difference between the second predictive image from the image generator 358 and the target image is detected to be the smallest, the switch 376 is connected to pole 380 to output the second predictive image from terminal 374 and the switch 376' is connected to pole 380' to output the affine coefficients pertaining to the second predictive image, that is, switches 376 and 376' produce a second data. If the difference between the third predictive image from the average calculator 362 and the target image is detected to be the smallest, the switch 376 is connected to pole 378 to output the third predictive image from terminal 374 and the switch 376' is connected to both poles 380' and 382' to output the affine coefficients pertaining to the first and second predictive images, that is, switches 376 and 376' produce a third or an average data.

It is to be noted that while the difference calculators above obtain the sums of square difference values given by equation (1), it is also possible to obtain the sum of absolute difference values as given by the following equation (2).

$$\sum_{i,j=0}^{image} |T_{ij} - Q_{ij}| \quad (2)$$

It is also noted that average calculator 362 and the difference calculator 364 can be omitted to simplify the arrangement.

A further case in which frame 2018 in FIG. 5 is predicted is described next. In this example, frame 2018 is the target image, i.e., the image frame to be coded, frame 2010 is the template, and frame 2020 is the image frame displayed chronologically after the target image 2018.

Figure 3:
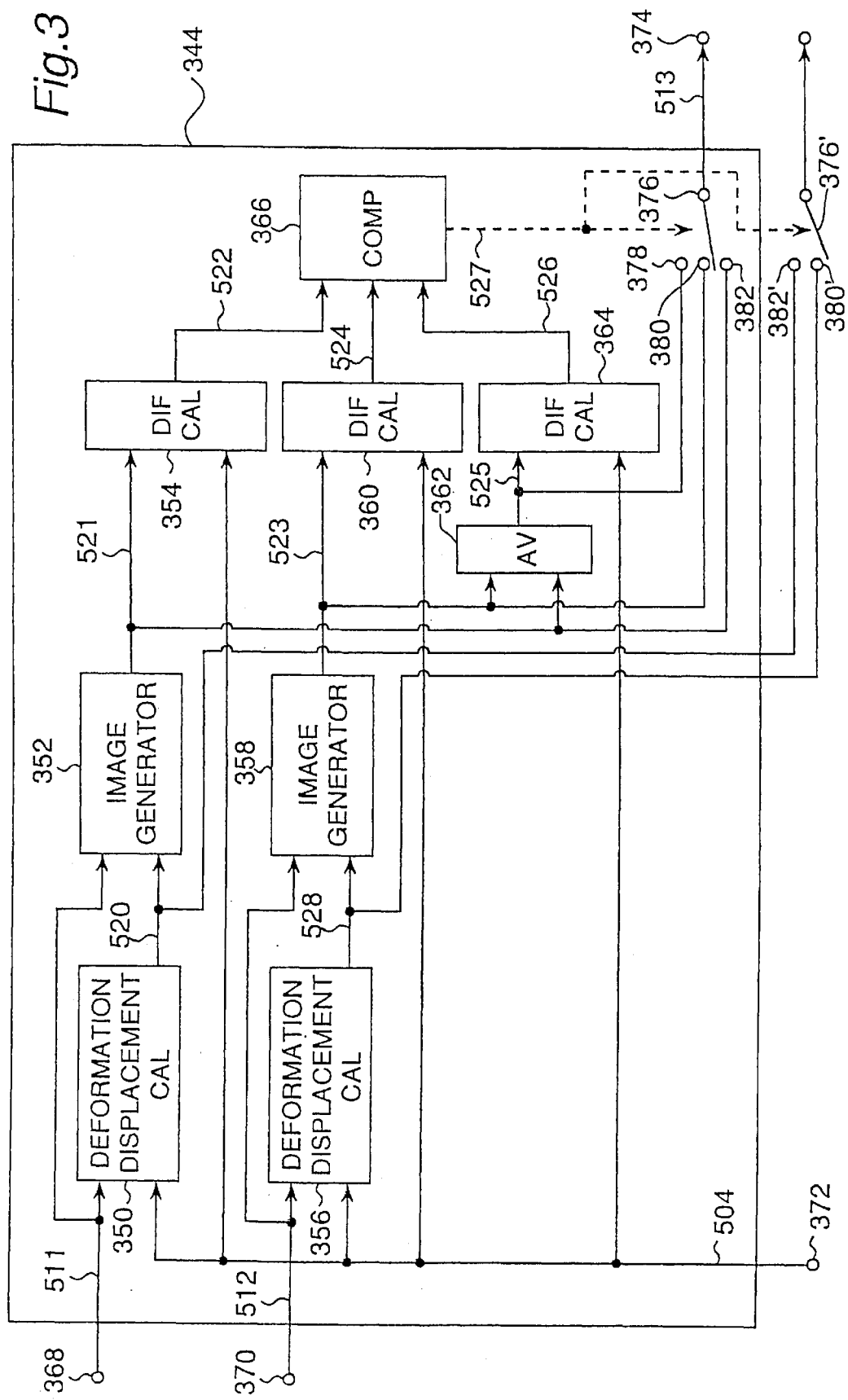
FIG. 3 is a block diagram of a predictor shown in FIG. 1.

Each of these images 2010, 2018, and 2020 is input to the predictor 344 shown in FIG. 3, specifically inputting target image 2018, i.e., the luminance signal and transmittance signal thereof, to terminal 372, the template 2010 to terminal 368, and the "future" or "next" frame 2020 to terminal 370. Note that the "next" frame 2020 is the decompressed, reconstructed image stored to the second frame memory 340 in FIG. 1.

The first predictive image (luminance and transmittance signals) is generated by the deformation and displacement calculator 350 and predictive image generator 352 using the target and templates as described above. This first predictive image and the target image are then input to the difference calculator 354, which obtains a first square difference sum from only the pixel values to be coded, and outputs to the comparator 366.

The second predictive image is likewise generated by the deformation and displacement calculator 356 and predictive image generator 358 using the target image and the "next" frame 2020. The second square difference sum is obtained by the difference calculator 360, and the result is output to the comparator 366.

The first and second predictive images are also input to the average calculator 362 to calculate the weighted averages of the respective luminance and transmittance signals and generate a third predictive image. The difference calculator 364 then obtains a third square difference sum from this third predictive image and the target image, and outputs to the comparator 366.

The comparator 366 thus compares these first, second, and third sums of square difference values, and controls the switches 376 and 376' to output the predictive image corresponding to the lowest difference value as described above.

Figure 4:
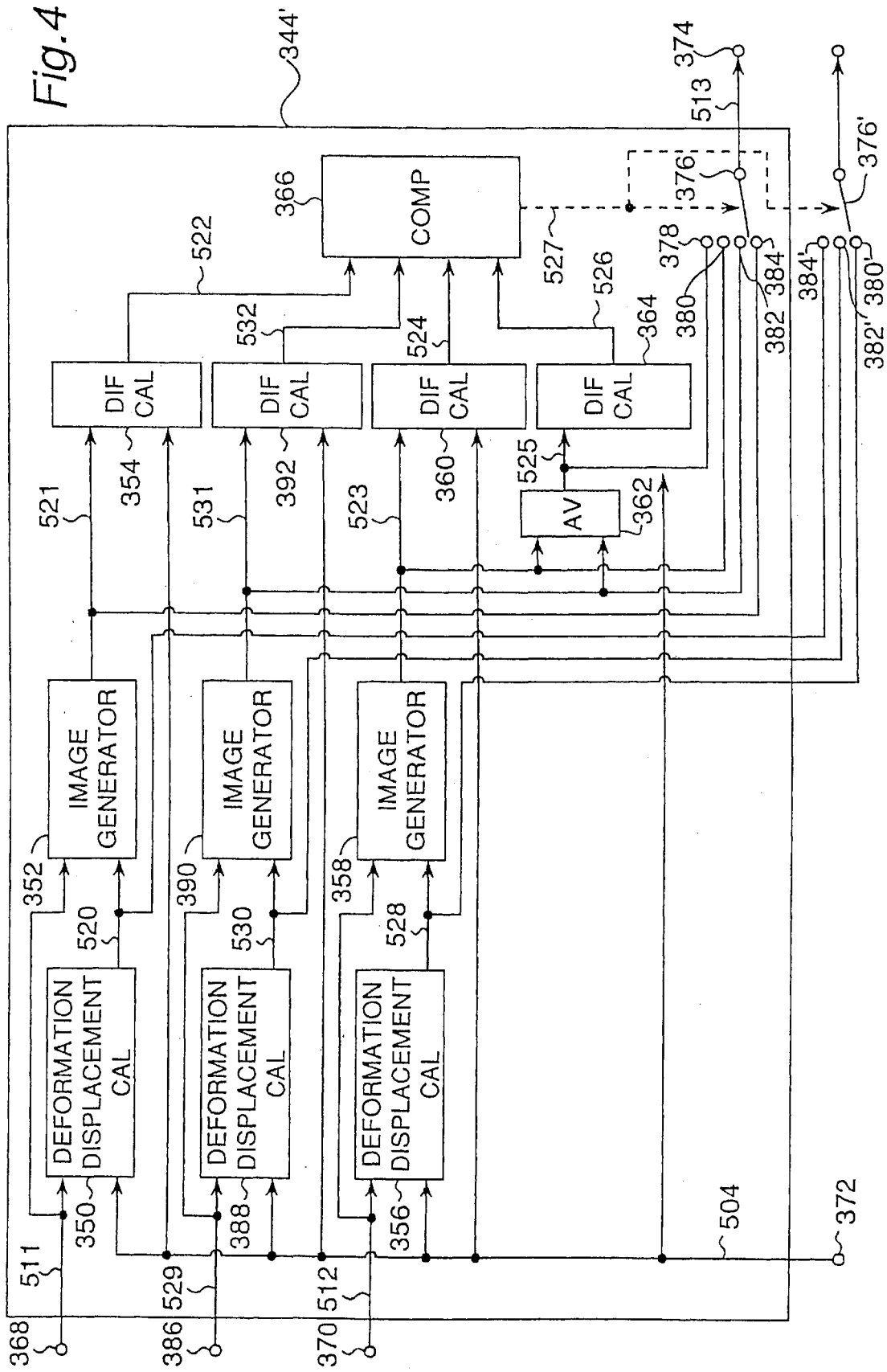
FIG. 4 is a view similar to FIG. 3, but showing an alternative embodiment of the predictor.

A further case in which frame 2022 in FIG. 5 is predicted or coded is described next. In this case, a predictor 344' shown in FIG. 4 is used. When compared with the predictor 344 of FIG. 3, the predictor 344' further has another set of a deformation and displacement calculator 388, a predictive image generator 390 and difference calculator 392. Also, the average calculator 362' is provided to calculate a weighted averages of the respective luminance and transmittance signals between the predictive images from the predictive image generators 390 and 358. It is noted that the average calculator can be so connected as to calculate a weighted averages of the respective luminance and transmittance signals between any two predictive images or among the three predictive images from the predictive images from the predictive image generators 352, 390 and 358. When the comparator 366 selects the difference from the difference calculator 364 as the smallest difference, switch 376' is so connected as to output affine coefficients pertaining to the predictive images applied to the average calculator 362.

For coding the frame 2022 shown in FIG. 5, the frame 2022 is the target image, i.e., the image frame to be coded, frame 2010 is the template, frame 2020 is the image frame displayed chronologically before the target image 2022, and frame 2024 is the image frame displayed chronologically after the target image 2022.

Each of these images 2010, 2020, 2022, and 2024 is input to the predictor 344 shown in FIG. 4, specifically inputting target image 2022, i.e., the luminance signal and transmittance signal thereof, to terminal 372, the template 2010 to terminal 368, the "previous" frame 2020 to terminal 370, and the "next" frame 2024 to terminal 386. Note that the "previous" and "next" frames 2020 and 2024 are the reproduced images of previously compression coded image data.

The first predictive image (luminance and transmittance signals) is generated by the deformation and displacement calculator 350 and predictive image generator 352 from the target and templates as described above. This first predictive image and the target image are then input to the difference calculator 354, which obtains a first square difference sum using only the pixel values to be coded, and outputs to the comparator 366.

The second predictive image is likewise generated from the "previous" frame 2020 by the deformation and displacement calculator 356 and predictive image generator 358, the second square difference sum is obtained by the difference calculator 360, and the result is output to the comparator 366.

A third predictive image is similarly generated from the target image and the "next" frame 2024 by the deformation and displacement calculator 388 and predictive image generator 390, a third square difference sum is obtained by the difference calculator 392, and the result is output to the comparator 366.

The second and third predictive images are also input to the averaging means 362 to obtain the weighted averages of the respective luminance and transmittance signals, and generate a fourth predictive image. The difference calculator 364 then obtains a fourth square difference sum from this fourth predictive image and the target image, and outputs to the comparator 366.

The comparator 366 thus compares these first, second, third, and fourth sums of square difference values, and controls the switches 376 and 376' to output the predictive image corresponding to the lowest difference value.

Figure 6:
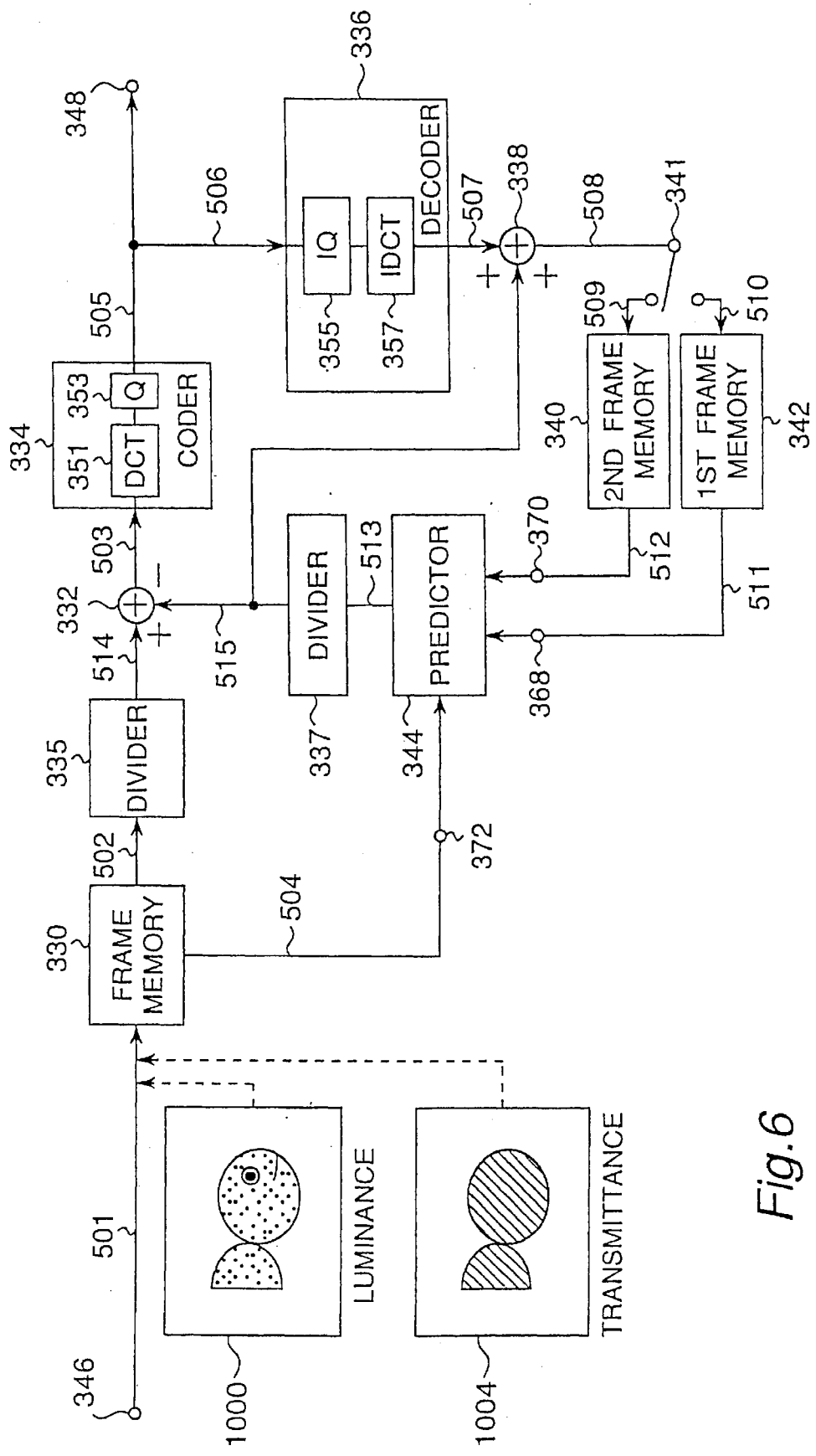
FIG. 6 is a block diagram of an image predictive coding apparatus according to a second embodiment of the present invention.

Referring to FIG. 6, an image predictive coding apparatus according to a second embodiment of the present invention is shown. As shown in FIG. 6, image dividers 335 and 337 are disposed after the frame memory 330 and predictor 344, respectively, and before the adder 332 to divide the target and predictive images into image blocks. The target image blocks and the predictive image blocks are input to the adder 332 from input lines 514 and 515, respectively, and the adder 332 obtains the difference signal from corresponding target and predictive image blocks. Note that coder 334 in this embodiment has no image divider 359.

In the embodiments described above, the predictive image is adaptively selected-and coded for the entire area of the input (target) image. Rather than selecting the predictive image for the entire image, however, it is also possible to divide the image area to be coded into plural subareas (blocks), and adaptively select and code an optimum predictive block for each image block. The preferable block size is 16×16 pixels or 8×8 pixels, but the image can be divided into blocks of any particular shape and size.

The basic coding apparatus is the same as shown in FIG. 1, except that an image divider 331 shown by a dotted line in FIG. 1 is further provided before terminal 372, and the input image is separated into blocks before being input for coding. The predictor 344 as shown in FIG. 3 or FIG. 4 is used, except that in this case the affine coefficient must be obtained not for a frame but only a portion of a frame. Thus, the images produced from said first and second frame memories 342 and 340 can be a block size equal to the block produced from said image divider 331. Thus, the size of each of the first and second frame memories can be smaller than one frame. Note that rotation and other conversion processes may be replaced by a simple parallel motion detection and compensation process. Block unit motion detection and compensation processes are described in U.S. Pat. Nos. 5,193,004 and 5,157,742 which are incorporated herein by reference. The present invention differs from these two references in that the predictive signal is generated by referring to a template.

Note that the second embodiment is the same as the first embodiment in all respects except that predictive image generation and processing is executed on an image block basis.

Figure 7:
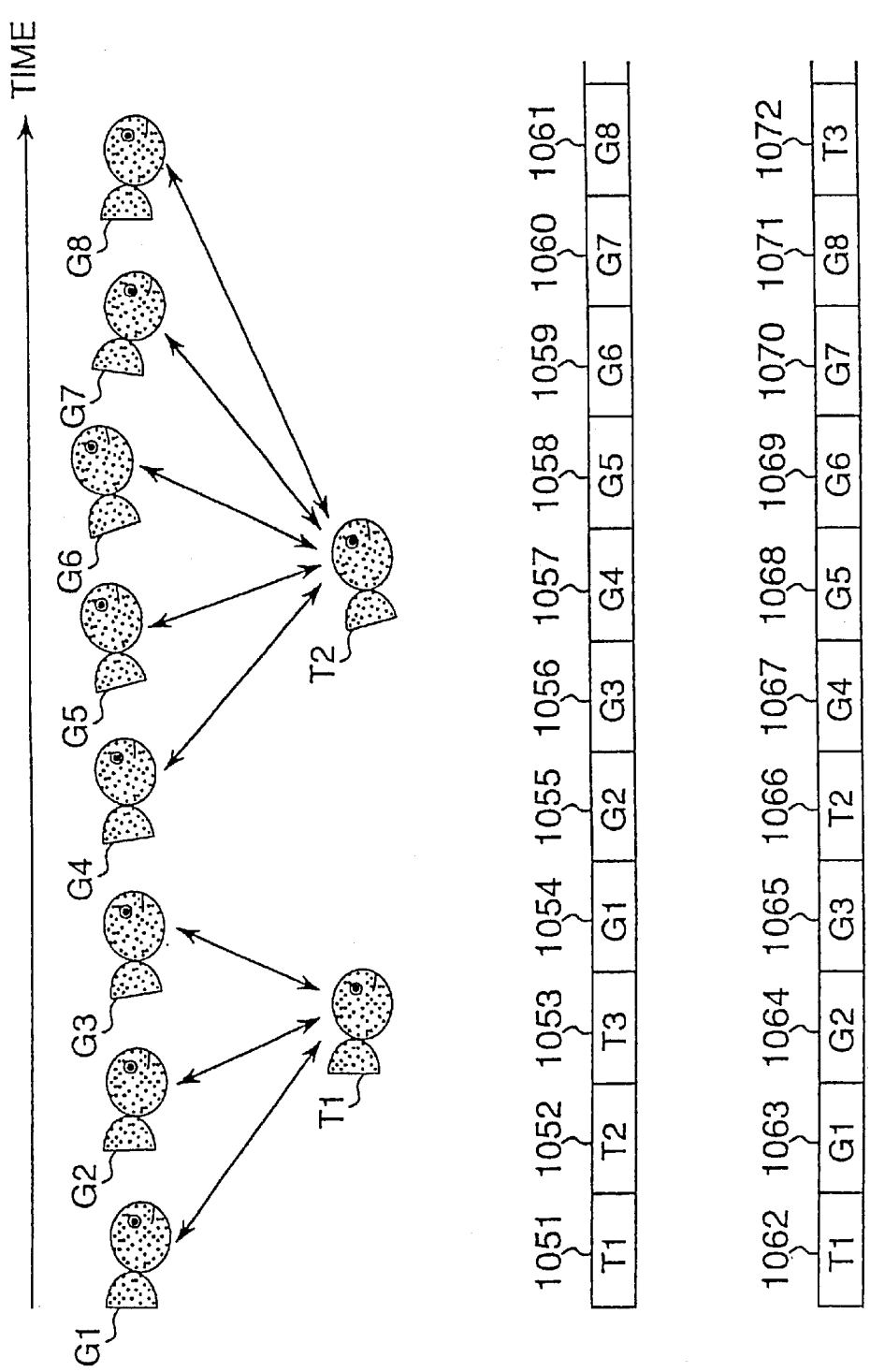
FIGS. 7A, 7B and 7C are diagrams showing the data structure generated by a predictive coding method using plural templates.

FIGS. 7A and 7B show the coded data structure multiplexing data generated by a predictive coding method using plural templates. FIG. 7A shows a sequence of images G1 to G8 of a fish swimming. Images G1 to G8 in this sequence are predicted using two templates T1 and T2.

The first step is to reproduce the templates by one of the methods of the compression code described above. Each of the images G1 to G8 is then generated by predictive approximation based on the deformation and displacement of the generated template, preferably using an affine transformation. The result is the coded data for templates T1 and T2, and each of the sequence images G1 to G8. A specific example of the coded data is shown in FIG. 12B. As shown in FIG. 12B and will be described below, each block contains coded motion information 1016, quantization amount 1017, and DCT coefficient 1018.

FIG. 7B illustrates the transfer method for the coded representative-image data of the present invention. As shown in FIG. 7B, the coded data for sequence images G1 to G8 (1054–1061 in FIG. 7B) is transferred after transferring all template data 1051, 1052, and 1053. Transferring all template data first offers the benefit of being able to reproduce the image sequence starting at any point in the sequence. Because the templates T1 and T2 are received and reproduced first by the receiver, reproduction of the image sequence can begin without delay from any frame G1 to G8, thus improving the usefulness of special reproduction modes (such as fast forward and reverse).

FIG. 7C shows an alternative transfer method for the coded template data according to the present invention. As shown in this example, the template data is transferred immediately preceding the image frames for which the template data is referenced for reproduction. Thus, because template T1 is referenced to reproduce images G1, G2, and G3, but template T2 is not, the coded data 1062 for template T1 is transferred first, followed immediately by the coded data (1063, 1064, and 1065) for images G1, G2, and G3, which is followed by the coded data 1066 for template T2.

This means that the coded template data is multiplexed to the data stream so that coded data for unreferenced templates is not transferred before the motion picture data. This transfer method makes it possible to reduce the delay time until the first image G1 can be reproduced, and reduces the frame memory requirements because it is not necessary to store all of the reproduced templates.

Figure 8:
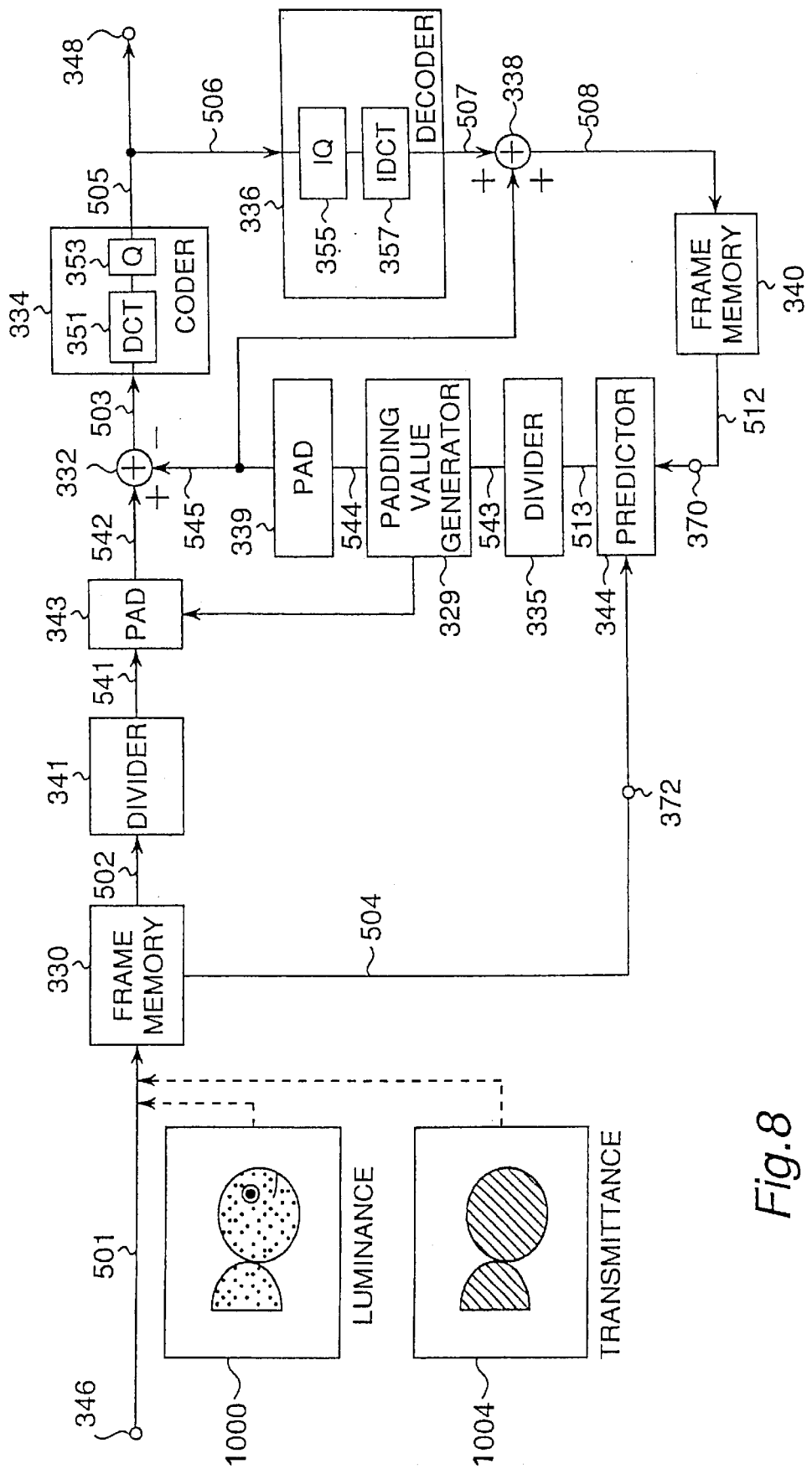
FIG. 8 is a block diagram of an image predictive coding apparatus according to a third embodiment of the present invention.

Referring to FIG. 8, an image predictive coding apparatus according to a third embodiment of the present invention is shown. A numeric example of the image prediction method used in the apparatus of FIG. 8 is shown in FIG. 9.

The image predictive coding apparatus shown in FIG. 8 is essentially identical to that shown in FIG. G. What differs is on the input side of the adder 332. More specifically, a pixel value substitution operation (pad operation) is accomplished before the difference value is obtained by the adder 332.

The output (luminance and transmittance signals) from the input frame memory 330 is first separated into plural blocks by image divider 341. The preferable size of these image blocks is 4×4 pixels, but the invention shall not be so limited. The output (luminance and transmittance signals) from the predictor 344 is likewise divided into plural blocks of 4×4 pixels by image divider 335. The output of the image divider 335 thus comprises the luminance signal blocks and the transmittance signal blocks, which are input to a padding value generator (substitute pixel value generator) 329.

The padding value generator 329 calculates the substitute pixel values by applying a known function to the pixels of greater than 0 transmittance (i.e., the pixels to be coded, corresponding to the black parts of transmittance signal 1000). The average of all pixels of less than 100% transmittance is preferably used, but the invention shall not be so limited.

The substitute pixel values are then input to pads (pixel value substitution means) 339 and 343 whereby the substitute pixel values are substituted for the pixel values (of the luminance signal) of 0% transmittance. The difference signal of the luminance signal blocks output from the pads 339 and 343 is then obtained by the adder 332. Note that the difference signal of the transmittance signal block values is obtained without making any substitution.

Figures 9A, 9B, 9C:
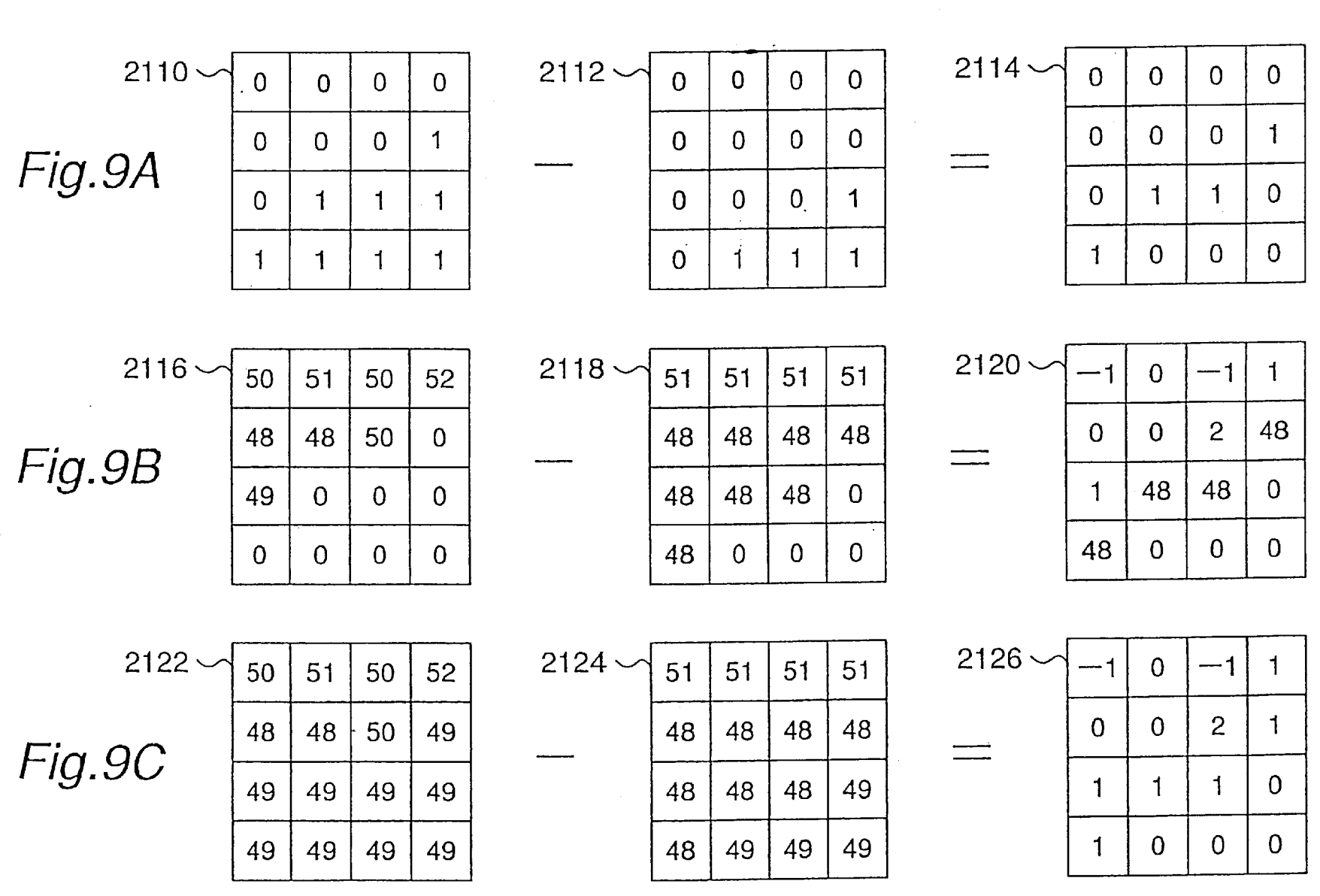

FIGS. 9A, 9B and 9C show a numeric example of the above operation. FIG. 9A shows the transmittance signal blocks. Block 2110 is output by the image divider 341 downstream from the input frame memory 330, and block 2112 is output by the image divider 335 downstream from the predictor 344. Pixels shown with a value of 0 (zero) in blocks 2110 and 2112 indicate the pixel values not to be coded (having 100% transmittance). To retain the transmittance information, the difference between blocks 2110 and 2112 is obtained directly, resulting in block 2114 output to the coder 334.

FIG. 9B shows the luminance signal blocks. Block 2116 is output from image divider 341, and block 2118 is output by image divider 335. The difference block obtained directly from these blocks is block 2120. The large difference values shown in block 2120 are a result of a mismatch between the contours of the pixels to be coded. Blocks 2112 and 2118 are input to the padding value generator 329 to obtain the average of the pixel values in block 2118 corresponding to the pixels in block 2112 having a value of zero. In this example, the average pixel value (substitute pixel value) is 49. Alternatively, blocks 2110 and 2118 are input to padding value generator 329.

The substitute pixel value 49 is then input to the pads 339 and 343, obtaining blocks 2122 and 2124 by substituting this substitute pixel value of 49 for the pixels having a transmittance signal value of 0. Block 2126 is then obtained by calculating the difference of blocks 2122 and 2124. Note that the difference value of block 2126 is clearly smaller than that of block 2120. By inputting block 2126 in place of block 2120 to the coder 334, coding can be accomplished using fewer bits.

Note that the substitute pixel values are obtained from the prediction blocks, and it is therefore not necessary to transfer the substitute pixel values (because the substitute pixel values can be recalculated on the receiving side). Furthermore, values obtained by applying a different known function, or a predetermined known value, may be substituted rather than using the average value described above insofar as the same value is substituted to both the target block and the prediction block, and the function or substitute pixel value is known on the receiving side.

Figure 10:
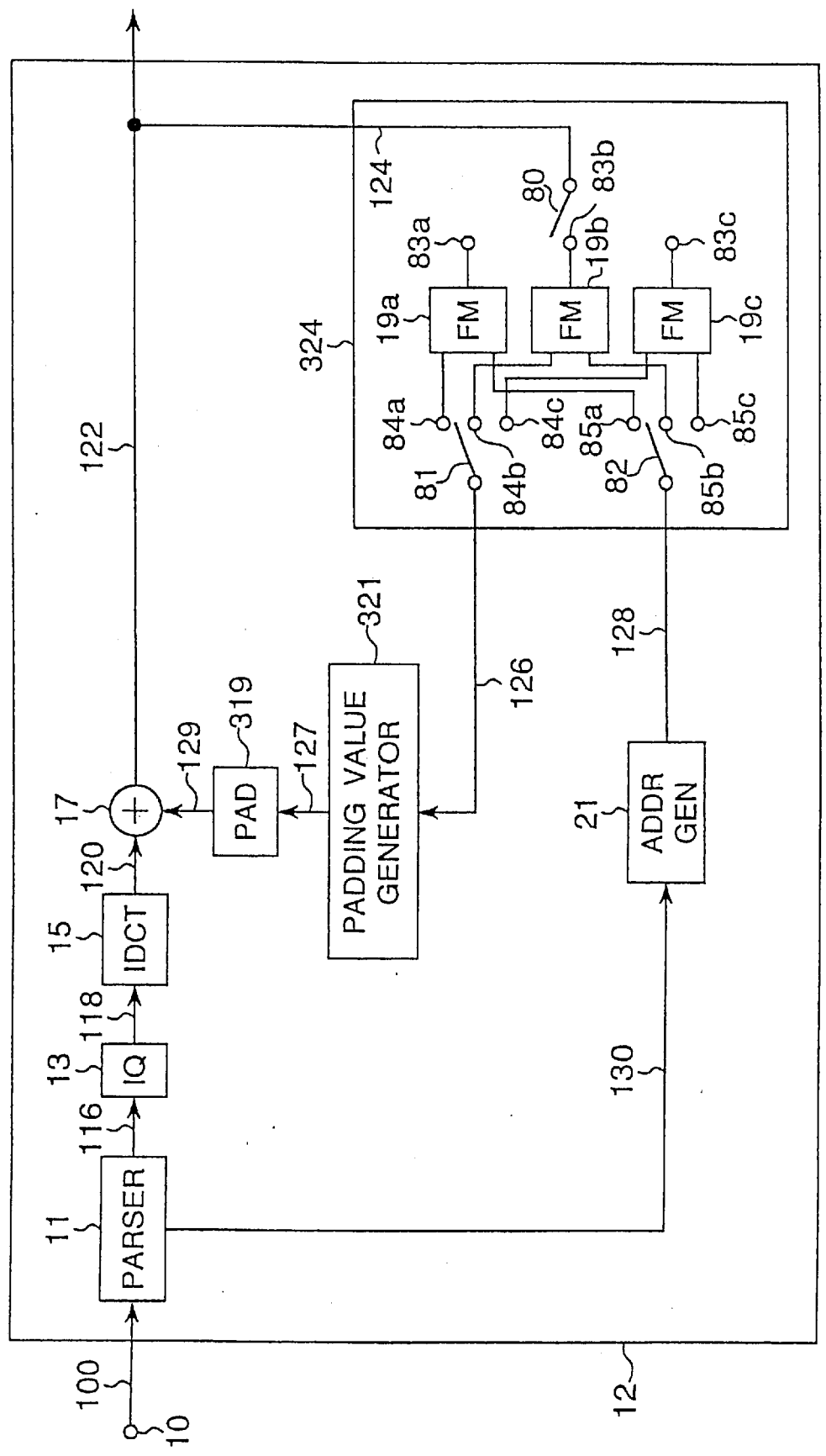
FIG. 10 is a block diagram of a preferred embodiment of a decoder according to the present invention.

FIG. 10 is a block diagram of an image decoder 12 used in any one of digital image decoding and synthesizing apparatuses of FIGS. 11, 13–17A. The data input to this decoder 12 is generated by the method described above. More specifically, an input image defined by a luminance signal expressing the pixel luminance value, and a transmittance signal expressing the pixel transparency value (state), is divided into plural target (image) blocks. The luminance and transmittance signals of each prediction block are then determined for the luminance and transmittance signals of the corresponding target block. For each target block containing at least one pixel value that should not be coded, a substitute pixel value is calculated by applying a known function to the prediction block pixel values to be coded. This substitute pixel value is then substituted into the target block and the corresponding prediction block for each pixel value therein not to be coded, and the difference between the target block and the prediction block is obtained using the substitute pixel values to code the image. The image decoding apparatus shown in FIG. 10 and described below decodes the image data thus coded.

As shown in FIG. 10, the decoder 12 preferably comprises an input terminal 10, a parser 11, an inverse quantizer 13, an inverse DCT operator 15, an adder 17, a frame memory bank 324, a prediction block generator (address generator) 21, a padding value generator 321, and a pad 319. The parser 11, inverse quantizer 13, and inverse DCT operator 15 defines the main part of the decoder.

The image data is input to the input terminal 10, and decoded by the decoder to generate the-difference signal. More specifically, the parser 11 parses the image data, and outputs the motion information over line 13C to address generator 21, and the quantization amount and quantization DCT coefficient over line 116 to the inverse quantizer 13. The inverse quantizer 13 multiplies the quantization DCT coefficient by the quantization amount to generate the inverse quantization DCT coefficient.

The inverse quantization DCT coefficient is sent over line 118 to the inverse DCT operator 15 for inverse conversion to a spatial domain difference signal. The difference signal is sent over line 120 to the adder 17 for combination with the prediction signal input from line 129 to generate and output the reconstructed signal. This reconstructed signal (luminance and transmittance signals), is also fed back to the frame memory bank 324 over line 124. The operation of the frame memory bank 324 is described below.

The address generator 21 converts the supplied motion information to the address used to access the frame memory bank 324, and the prediction signal block is read from that address in the frame memory bank 324. The prediction block is then input over line 126 to the padding value generator 321, which applies a known function to the pixel values that should be coded in the prediction block to generate the substitute pixel value. Note that the function used here must be the same as the function used on the transmission side. The preferred substitute pixel value is the average of the pixel values that should be coded.

The substitute pixel value and the prediction block are then input to the pad 319, which replaces the pixel values not to be coded in the prediction block with the substitute pixel value, and then outputs over line 129 to the adder 17.

The image objects thus reproduced can then be synthesized based on the transmittance information, and displayed. This process is described below with reference to the following embodiments.

Multiplexing must be used to compression code and transfer an image comprising plural layers as shown in FIG. 2. The digital image transfer operation is described below with reference to FIGS. 12A, 12B and 12C.

Figure 12A:
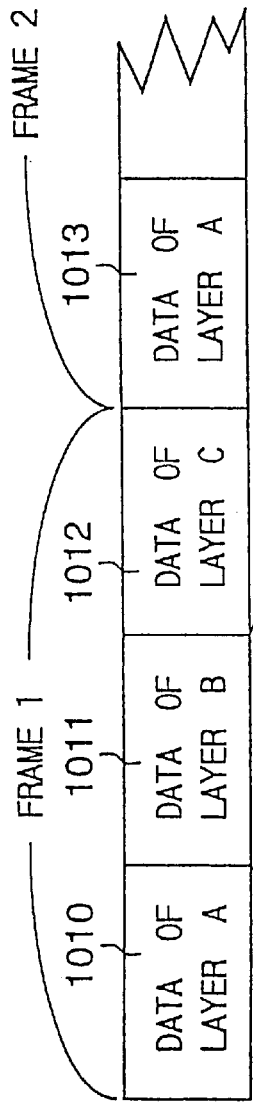
FIGS. 12A, 12B and 12C are diagrams showing the data structure generated by compression coding plural image layers, and multiplexing the data.
Figure 12B:
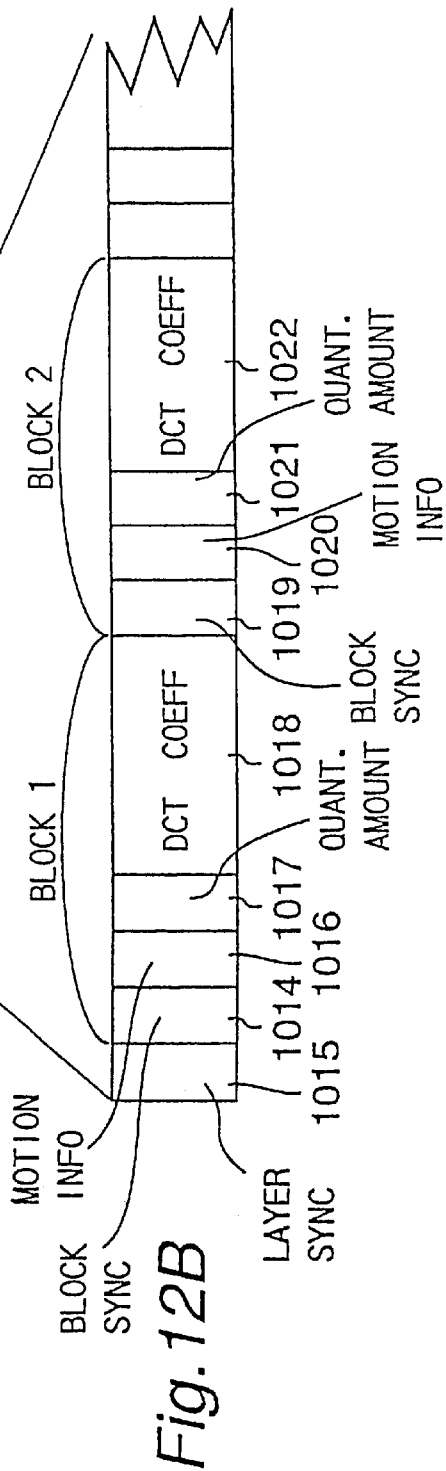
Figure 12C:
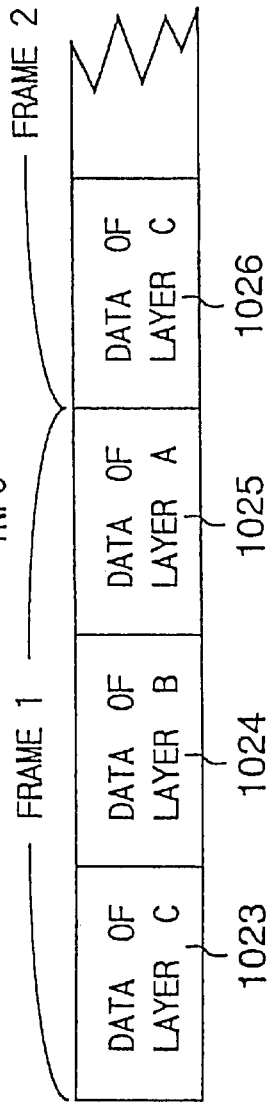

FIG. 12A shows the multiplexed structure of coded data comprising three layers (data 1010 for layer A, data 1011 for layer B, and data 1012 for layer C) defining one image frame (frame 1) Data 1010 for layer A, data 1011 for layer B, and data 1012 for layer C correspond to image A 1000, image B 1001, and image C 1002 shown in FIG. 2, respectively. The data structure shown in FIG. 12A is therefore obtained by multiplexing the image layers in sequence from the foreground layer. A variation of this structure would be to multiplex the layers in sequence from the background layer, i.e., data 1023 for layer C, data 1024 for layer B, and data 1025 for layer A, as shown in FIG. 12C.

The layer data starts with a layer synchronization signal 1015, followed by a block synchronization signal 1014, the motion information 1016 for that block, the quantization amount 1017, and the DCT coefficient 1018, as shown in FIG. 12B. When a transmittance signal is present, the transmittance signal coefficient is also included in addition to the luminance signal DCT coefficient.

It is to be noted that while the preceding embodiments of the invention have been described using motion compensation DCT, sub-band, wavelet, or fractal coding may be alternatively used. In addition, multiplexing by image layer has been described above, but the layer data may also be divided into blocks of a known bit size, and the blocks then packetized for multiplexing. In this case, the data may be multiplexed in a sequence such as layer A packet 1, layer B packet 1, layer C packet 1, layer A packet 2, layer B packet 2, layer C packet 2 . . .

The decoding and synthesizing apparatus according to the first embodiment of the present invention is described next with reference to the block diagram in FIG. 11. The coded data multiplexed using the format shown in either FIG. 12A or 12C is input to external line input terminal 10. The decoder 12 then decodes the coded data in each layer to a reconstructed image, which is stored to the frame memory FM0 14. The image synthesizer 16 overlays the reconstructed image with the synthesized image stored to the feedback frame memory FM1 22 to generate a new synthesized image. This new synthesized image is then stored to the frame memory FM1 22, and to the display memory 18 for display by the output device 20. Process controller 24 controls both the frame memory FM0 14 and the frame memory FM1 22.

The preferred embodiment of the decoder 12 is shown in FIG. 10, and is described below for the case in which the coded data multiplexed as shown in FIG. 12C is decoded and synthesized.

The coded data 1023 for layer C (the background layer) is first input to the external line input terminal 10. The parser 11 then parses the image data, and outputs the motion information over line 130 to address generator 21, and the quantization amount and quantization DCT coefficient over line 116 to the inverse quantizer 13. The inverse quantizer 13 multiplies the quantization DCT coefficient by the quantization amount to generate the inverse quantization DCT coefficient.

The inverse quantization DCT coefficient is sent over line 118 to the inverse DCT operator 15 for inverse conversion to a spatial domain difference signal. The difference signal is sent over line 120 to the adder 17 for combination with the prediction signal (after pixel value substitution) input from line 129 to generate and output the reconstructed signal. This reconstructed signal is also fed back to the frame memory bank 324 over line 124. The frame memory bank 324 comprises plural frame memory units.

In this example, the frame memory bank 324 comprises three frame memory units 19a, 19b, and 19c. Frame memory 19c is used to store the layer C image in this example. To read the layer C image from the frame memory bank 324, switch 80 is connected to terminal 83c, switch 81 to terminal 84c, and switch 82 to terminal 85c. The address generator 21 converts the motion information to a frame memory address to read the prediction signal from the assigned frame memory 19c, which thus outputs layer C over line 126 to the padding value generator 321.

Figure 11:
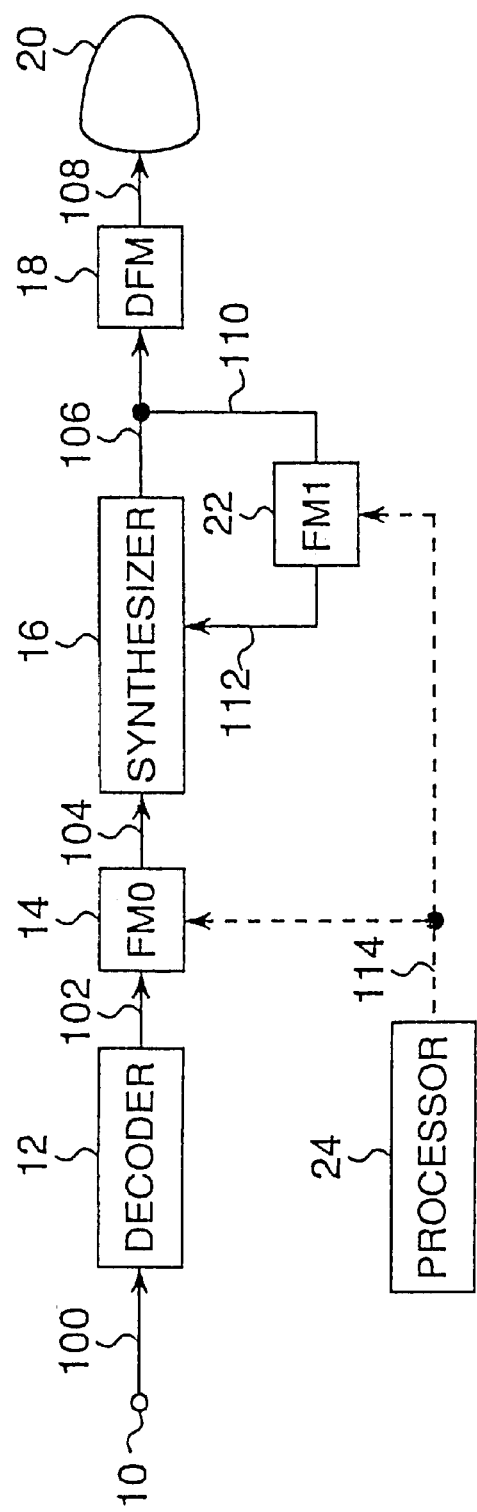
FIG. 11 is a block diagram of a digital image decoding and synthesizing apparatus according to a first embodiment of the present invention.

The decoded layer C image is then output to the frame memory FM0 14 in FIG. 11. Since layer C is the first layer in the frame in this example, the process controller 24 sets the frame memory FM1 22 to a known value. This known value indicates that the frame memory value is not a valid pixel, and is preferably set to zero. The process controller 24 also outputs the pixel values for the same location from frame memories 14 and 22 to the image synthesizer 16 in the scanning sequence.

The process executed by the image synthesizer 16 is described next. The image stored to the frame memory FM0 14 is drawn on top of the image written to frame memory FM1 22 because the image in frame memory FM0 14 is the image layer above the layer of the image in frame memory FM1 22. The image synthesizer 16 compares the pixels input from the frame memory FM0 14 with the corresponding pixels in the same position in the image input from the frame memory FM1 22. If the pixel value in the image from the frame memory FM1 22. If the pixel value in the image from the frame memory FM0 14 is not a particular value (e.g. the pixel value is zero), the pixel from the frame memory FM0 14 is output; if the pixel value in the image from the frame memory FM0 14 is a particular value (e.g. the pixel value is zero), the pixel from the frame memory FM1 22 is output. The output pixels are buffered to the display memory 18 for display to the output device 20, and simultaneously fed back to the frame memory FM1 22 for storage.

The coded data 1024 of layer B in FIG. 12C is next input to the external line input terminal, decoded as described above to the reconstructed image by the decoder 12, and input to the frame memory FM0 14. Frame memory 19b in the decoder 12 is used to store the layer B image in this example. To read the layer B image from the frame memory bank 324, switches 80, 81, and 82 are therefore respectively switched to terminals 83b, 84b, and 85b, and the image layer is thus output and decoded. The images from frame memory FM0 14 and frame memory FM1 22 are then overlaid by the image synthesizer 16 as described above, and output to the display memory 18 and frame memory FM1 22. As a result, the layer B image is overlaid to the layer C image.

The coded data 1024 of layer A in FIG. 12C is next input to the external line input terminal, decoded as described above by the decoder 12, and overlaid to the image from frame memory FM1 22 by the image synthesizer 16. Frame memory 19a in the decoder 12 is used to store the layer A image in this example. To read the layer A image from the frame memory bank 324, switches 80, 81, and 82 are therefore respectively switched to terminals 83a, 84a, and 85a. The image for layer A is thus output and decoded, and can be overlaid on top of the layer B and C images for display.

This process is then repeated for the next frame. It is to be noted that while the present embodiment has been described using three layers, the same essential process can be applied to any number of image layers. Note, further, that the number of frame memory units in the frame memory bank 324 of the decoder 12 must correspond to the number of image layers.

When the image data is coded using a format as shown in FIG. 12A, the process executed by the image synthesizer 16 must be modified. Specifically, the image layers stored to the frame memory FM1 22 are the images to be overlaid on top of the images stored to the frame memory FM0 14 because the image is multiplexed in sequence from the foreground layer. The image synthesizer 16 again compares the pixels input from the frame memory FM0 14 with the corresponding pixels in the same position in the image input from the frame memory FM1 22. In this case, however, if the pixel value in the image from the frame memory FM1 22 is not a particular value (e.g. the pixel value is zero), the pixel from the frame memory FM1 22 is output; if the pixel value in the image from the frame memory FM1 22 is a particular value (e.g. the pixel value is zero), the pixel from the frame memory FM0 14 is output. Thus, the layer received last can be correctly placed below the layer received first.

Figure 13:
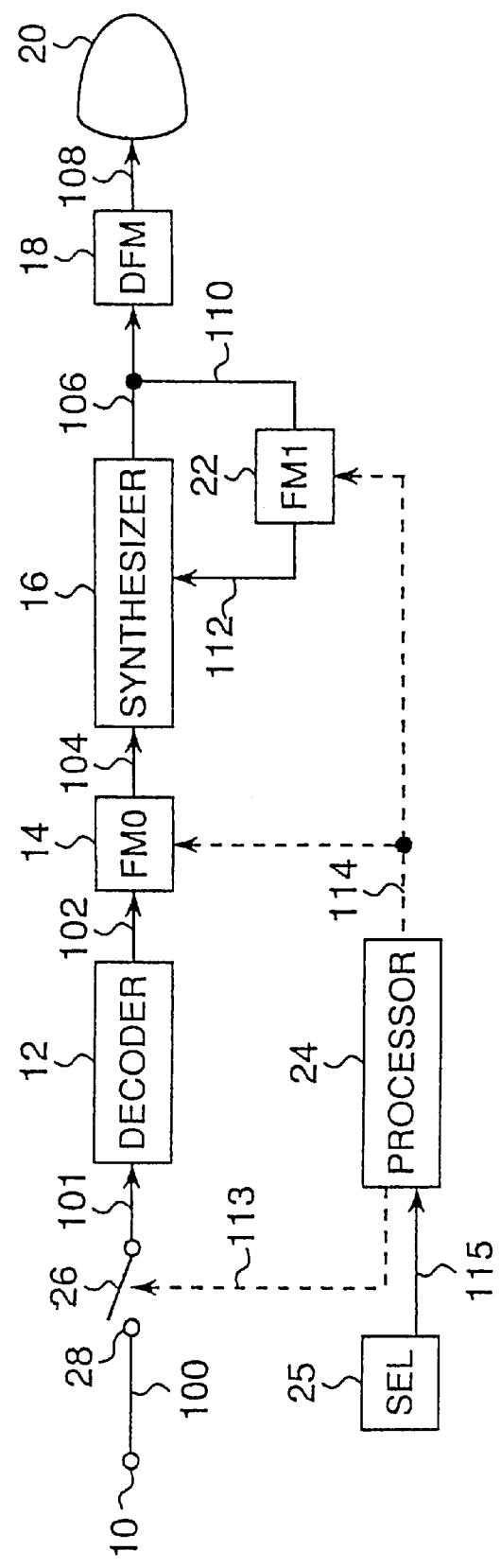
FIG. 13 is a block diagram of a digital image decoding and synthesizing apparatus according to a second embodiment of the present invention.

FIG. 13 is a block diagram of a second embodiment of a digital image decoding and synthesizing apparatus according to the present invention. This embodiment is essentially identical to that shown in FIG. 11. What differs is that a switch 26 is inserted between the input terminal 10 and the decoder 12, and a display selector 25 is added.

The switch 26 is controlled by the process controller 24 via line 113. When the image decoding and synthesizing apparatus is not reproducing and displaying a particular layer, the switch 26 is open, thus interrupting the signal line between the input terminal 10 and the decoder 12. The process controller 24 can control the switch 26 to prevent processing a particular layer when there is not sufficient processing capacity available by evaluating the available processing capacity of the apparatus. Using the display selector 25, it is also possible for the user to control the operation of the switch 26 to reproduce and display only a particular layer.

Figure 14:
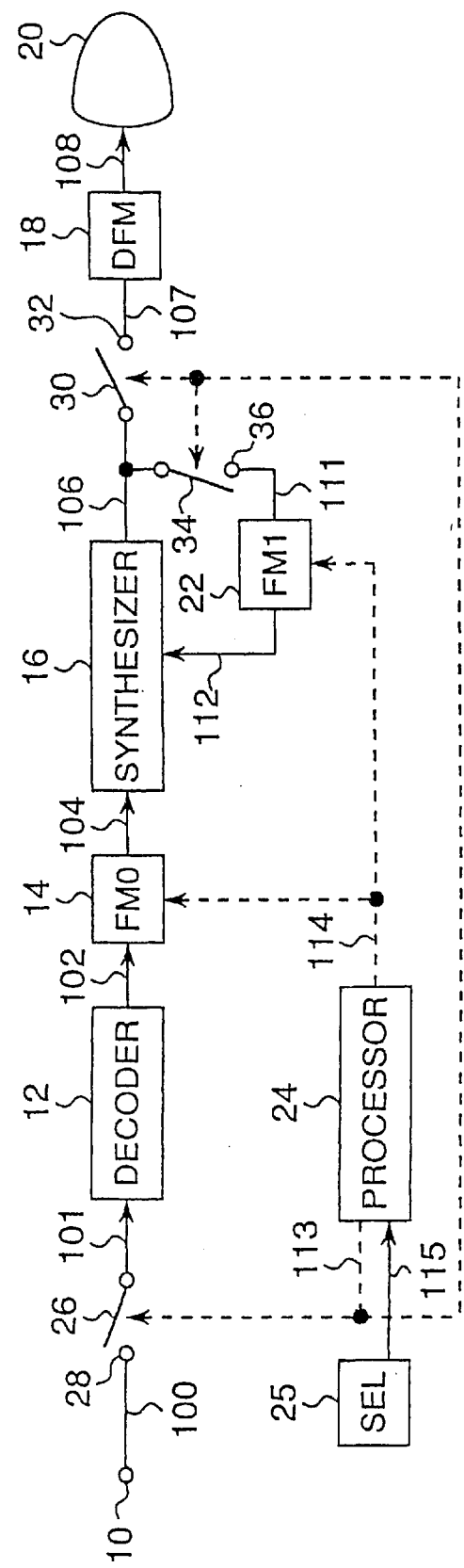
FIG. 14 is a block diagram of a digital image decoding and synthesizing apparatus according to a third embodiment of the present invention.

The display selector 25 may be a keyboard, mouse, or other interface device. To not display the background layer (layer C in FIG. 2), for example, the corresponding layer synchronization signal is detected by a layer synchronization signal detector (not shown in the figures), and the switch 26 is controlled to open when the synchronization signal for layer C is detected, thereby preventing layer C from being processed FIG. 14 is a block diagram of a third embodiment of a digital image decoding and synthesizing apparatus according to the present invention. This embodiment is essentially identical to that shown in FIG. 13. What differs is that another switch 34 is inserted between the image synthesizer 16 and the frame memory FM1 22, and a switch 30 is inserted between the image synthesizer 16 and the display memory 18. Both of these switches 34 and 30 are controlled by the process controller 24, and can be interactively controlled by the user using the display selector 25.

When the image stored to the frame memory FM1 22 is not to be updated, the process controller 24 opens the switch 34 to disconnect the image synthesizer 16 from the frame memory FM1 22. Likewise, when the image synthesizer output is not to be displayed, the corresponding switch 30 is opened to disconnect the image synthesizer 16 from the display memory 18.

This process is described below for the case in which image data multiplexed with layers A (foreground), B (middle layer), and C (background) is input and reproduced and displayed for a period of time because the three switches 26, 30, and 34 are closed. The user then operates the display selector 25 to bring layer B to the foreground while freezing the display of layers A and C.

FIG. 18 shows a table indicating the different positions of each switch and the corresponding change in the content of the feedback frame memory FM1 22 and the display memory 18 for the case in which the coded data is sequentially input from the background layer, i.e., is input and decoded in the sequence C1, B1, A1, C2, B2, A2, . . . Note that in FIG. 18, ON represents a closed switch position (continuity exists), and OFF represents an open switch position (continuity does not exist). The display selection signal is assumed to be input through the display selector 25 at the beginning of frame 2.

Both switches 26 and 34 are closed when frame 1 is input, allowing the content of frame memory FM1 22 to be continuously updated and resulting in a synthesized image of layers A1+B1+C1. Switch 30 is open until the synthesized image of layers A1+B1+C1 is output, at which time switch 30 closes to update the image comprising layers A0+B0+C0 stored in the display memory 18 to be updated to the image comprising layers A1 +B1+C1. The image from frame 1 continues to be displayed during the period for frame 2 because the desired image (frame 2 image) is still being processed. As a result, the switch 30 remains open and the display memory 18 continues to store the frame 1 image. In order to synthesize an image from layers C2 and A2, switches 26 and 34 are held closed while layers C2 and A2 are input, but are opened when layer B2 is input. More specifically, switches 26 and 34 are closed when layer C2 is input, opened when layer B2 is input, and then closed again when layer A2 is input. As a result, only layers C2 and A2 are written to the frame memory FM1 22. Switch 34 is then opened so that the frame memory FM1 22 is not updated and holds the image synthesized from layers A2+C2.

When frame 3 and subsequent frames are input, switches 26 and 34 are closed (ON) only during the period for layer B (B3, B4, . . . ), thereby enabling decoding, reconstruction, synthesis, and display of layer B with the synthesized image of layers A2+C2 after buffering to the display memory 18. It is thus possible to display layer B in the foreground while freezing display of the other layers in a still mode.

Figure 15:
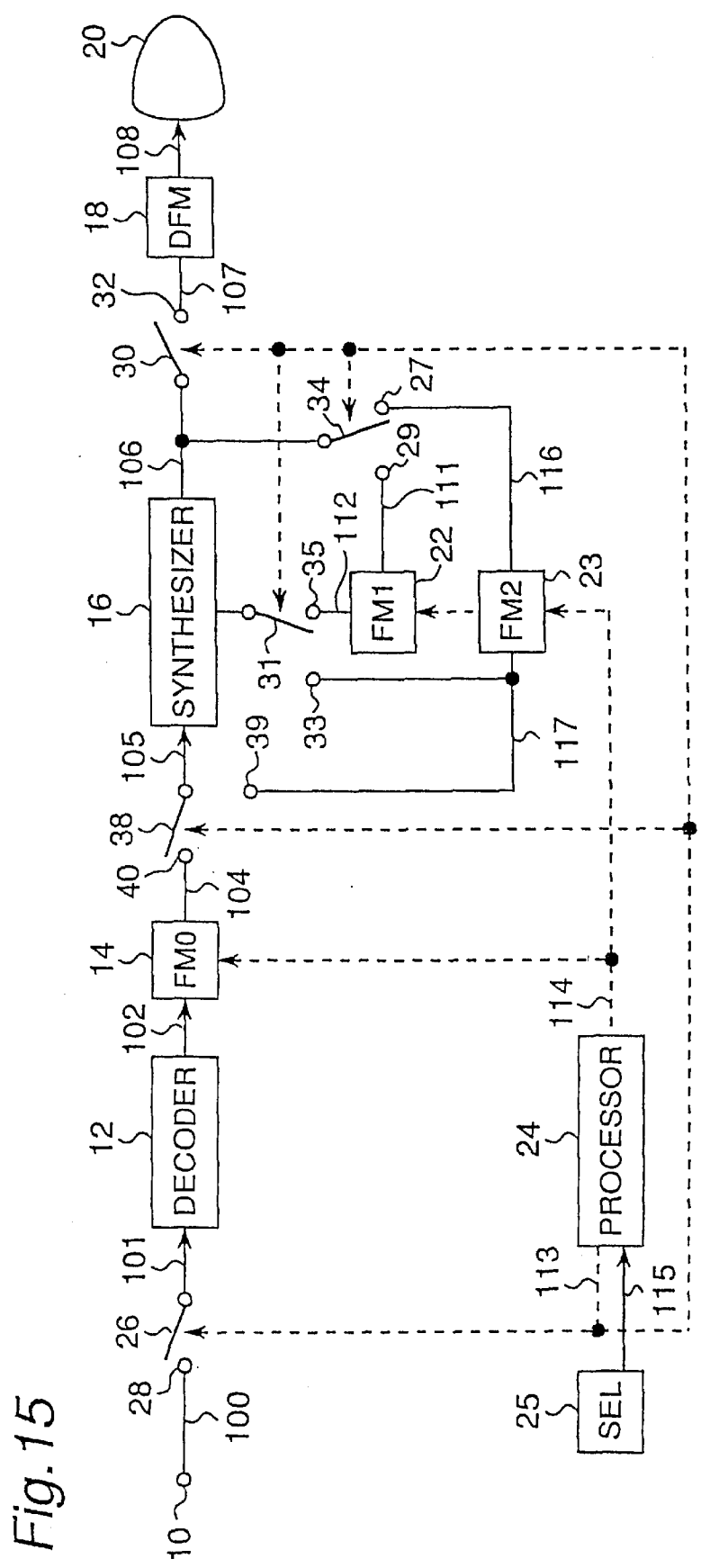
FIG. 15 is a block diagram of a digital image decoding and synthesizing apparatus according to a fourth embodiment of the present invention.

FIG. 15 is a block diagram of a fourth embodiment of a digital image decoding and synthesizing apparatus according to the present invention. This embodiment is essentially identical to that shown in FIG. 14. What differs is that another frame memory FM2 23 is added to complement frame memory FM1 22, and switches 34 and 31 are disposed to is select the input and output of these two frame memory units. Another switch 38 is also provided to switch the input to the image synthesizer 16 between frame memory FM0 14 and frame memory FM2 23. These switches are controlled by the process controller 24, and can be interactively controlled by the user using the display selector 25.

This embodiment is described below with reference to a table in FIG. 19. As in the table of FIG. 18, ON represents a closed switch position (continuity exists), and OFF represents an open switch position (continuity does not exist). In addition, "P" represents a terminal (switch pole) such that "P40" shown in the line for switch 38 means that switch 38 is connected to terminal (pole) 40 (Continuity exists through switch 38 to terminal 40).

It is assumed that frame 1 is normally decoded and synthesized, i.e., layer B1 is overlaid to layer C1, and layer A1 to layer B1. To achieve this, switch 26 is closed, and switches 38, 34, and 31, respectively, are connected to terminals 40, 29, and 35. Switch 30 closes after the synthesized image of layers A1+B1+C1 is obtained to output the synthesized image through the display memory 18 to the output device 20.

A display selection signal instructing layer B to be displayed in the foreground while the other layers are also refreshed and displayed is then input from the display selector 25 at the beginning of frame 2. Because each layer is to be reproduced and displayed, switch 26 remains closed. Both frame memories FM1 22 and FM2 23 are set to a particular value at the beginning of frame 1.

Layer C2 is then decoded and output through switch 38 from the frame memory FM0 14 to the image synthesizer 16. The output from the image synthesizer 16 is routed through switch 34 for storage to the frame memory FM1 22.

Layer B2 is then decoded and output through switch 38 from the frame memory FM0 14 to the image synthesizer 16, combined thereby with the image held in the frame memory FM2 23 (which was previously set to a particular value), and then routed by switch 34 for storage to the frame memory FM2 23.

Layer A is then similarly decoded, but is synthesized with the layer C2 image stored to the frame memory FM1 22. The selector switch 31 is therefore switched to terminal 35, and the synthesized image is routed through switch 34 for storage to the frame memory FM1 22. As a result, the synthesized image A2+C2 is stored to frame memory FM1 22, and the layer B2 image is stored to frame memory FM2 23. Switches 38 and 31 are then switched to terminals 39 and 35, respectively, to synthesize layer B2 with layers A2+C2 for display. By repeating this process for each layer in the following frames, a motion picture in which layer B is displayed in the foreground can be obtained.

While the above description refers specifically to coded data multiplexed in sequence from the background layer, the same essential process is used to process coded data multiplexed in sequence from the foreground layer.

Figure 16:
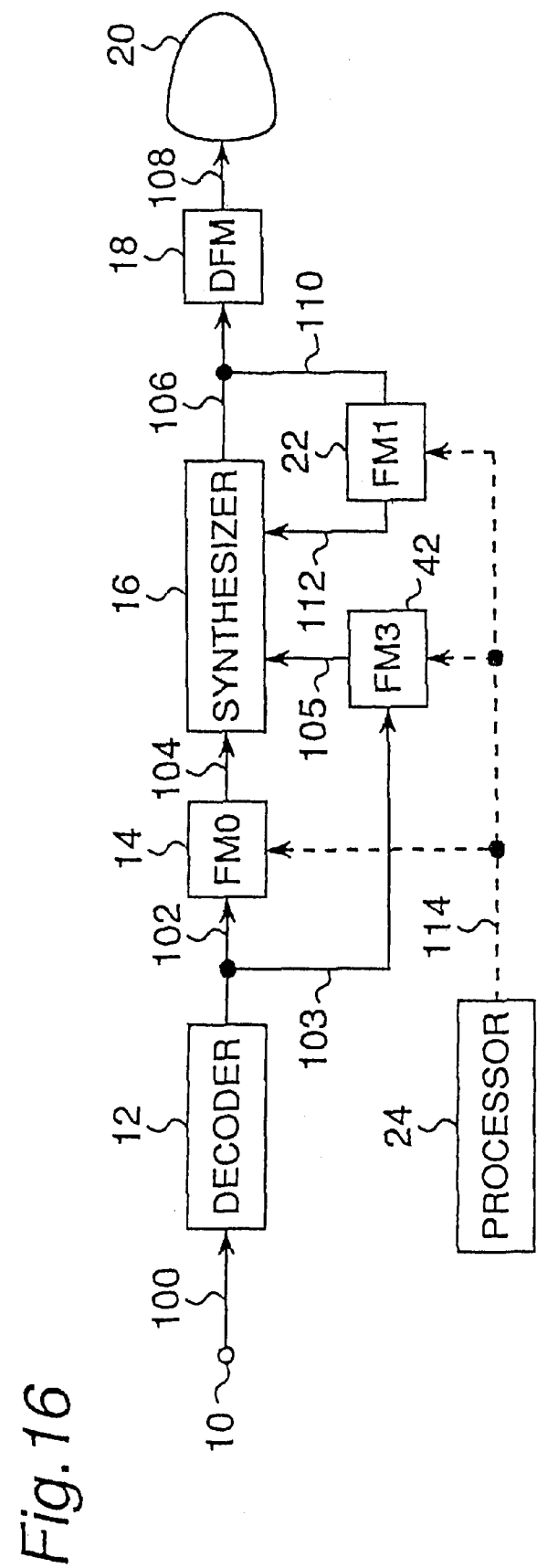
FIG. 16 is a block diagram of a digital image decoding and synthesizing apparatus according to a fifth embodiment of the present invention.
Figure 17:
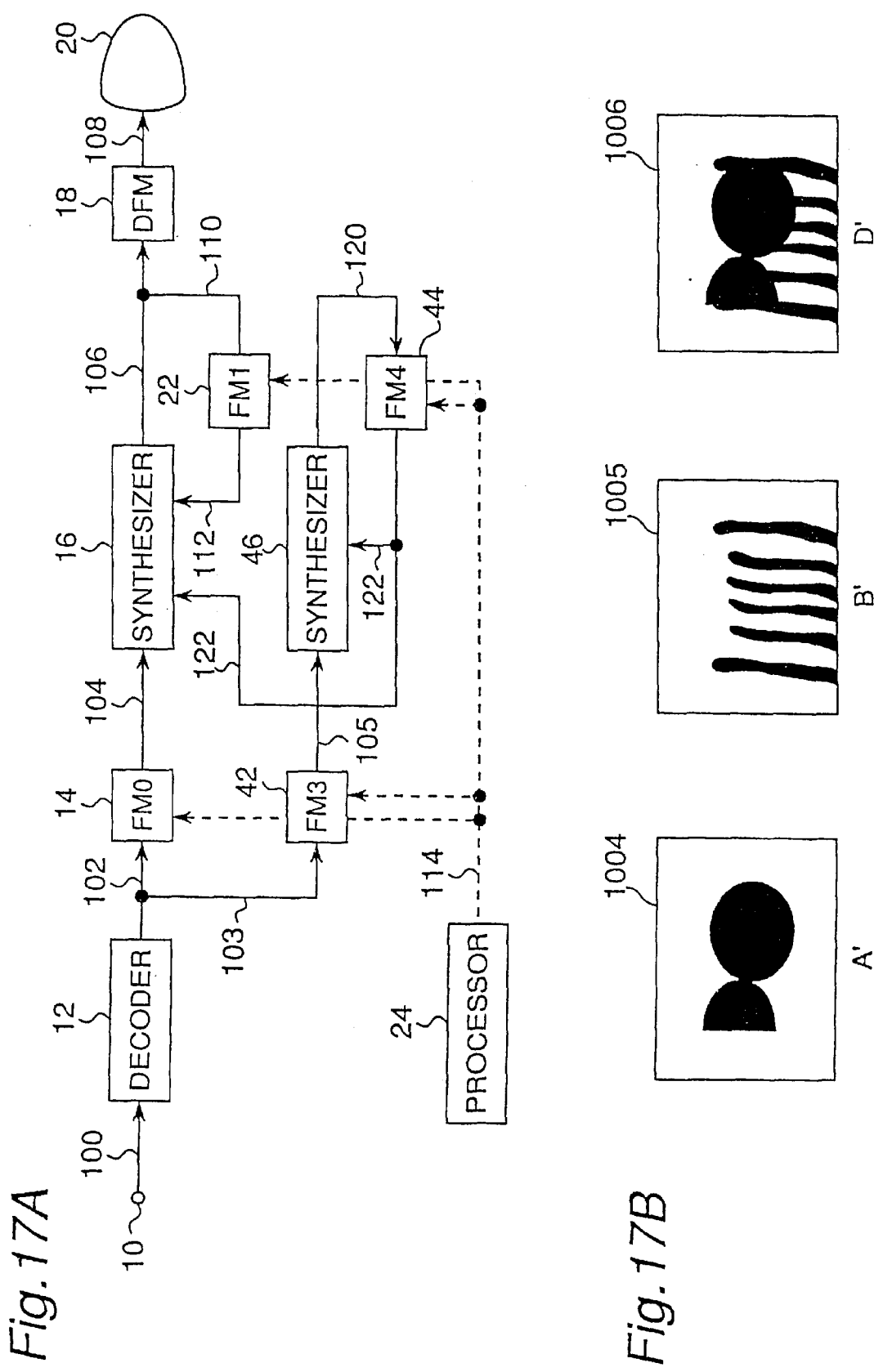
FIG. 17A is a block diagram of a digital image decoding and synthesizing apparatus according to a sixth embodiment of the present invention.
FIG. 17B is a diagram showing the steps for synthesizing the layers.

FIG. 16 is a block diagram of a fifth embodiment of a digital image decoding and synthesizing apparatus according to the present invention. This embodiment is essentially identical to that shown in FIG. 11. What differs is that another frame memory FM3 42 is added for decoding and synthesizing coded data containing a transmittance signal. In the example below, the coded data to be decoded and synthesized is multiplexed in sequence from the background layer as shown in FIG. 12C. The basic operation is as described above with respect to FIG. 11, except that the luminance and transmittance signals of the reconstructed image in each layer are stored to the frame memory FM0 14 and frame memory FM3 42, respectively, and then merged with the synthesized image supplied from the feedback frame memory FM1 22.

Using the transmittance signal stored to the frame memory FM3 42, the image synthesizer 16 merges the image in the frame memory FM0 14 with the image in the frame memory FM1 22. If x0 is the pixel value from the frame memory FM0 14, x1 is the pixel value from the frame memory FM1 22, and $\alpha$ is the value from the frame memory FM3 42, an opaque object is present and the background cannot be seen when $\alpha$ is 100% when $\alpha$ is 0%, there is no object present, and the background is displayed through the other layers. The synthesized pixel value y can thus be obtained from the equation $$y=\alpha*x0+(1-\alpha)*x1.$$

It is thus possible to place the foreground image received after the other layers over the other layers, and when a is between 0% and 100%, the transparency of the corresponding objects can be appropriately adjusted. Note that a selective display capability can be provided in the apparatus shown in FIG. 16 by adding switches and frame memory as shown in FIGS. 13, 14, and 15 and described above.

FIG. 17A is a block diagram of a sixth embodiment of a digital image decoding and synthesizing apparatus according to the present invention. FIG. 17A is a digital image decoding and synthesizing apparatus for decoding and synthesizing coded data containing a transmittance signal as described above with reference to FIG. 16. In this case, however, the coded data to be decoded and synthesized is multiplexed in sequence from the foreground layer as shown in FIG. 12A. An image synthesizer 46 for synthesizing the transmittance signals stored to the frame memory FM3 42, and an additional frame memory FM4 44 for storing the result of transmittance signal synthesis, are also provided.

The basic process executed by this apparatus is the same as that described above with reference to FIG. 16, except that the processes executed by the image synthesizers 16 and 46 is modified because the images are decoded in sequence from the foreground layer.

The luminance and transmittance signals for layer A are first decoded, and stored to the frame memory FM0 14 and frame memory FM3 42, respectively. Layer A is not synthesized because it is the first layer in the frame, and the luminance and transmittance signals are therefore stored to the frame memory FM1 22 and frame memory FM4 44. A transmittance signal A' as shown in FIG. 17B is stored to the frame memory FM4 44.

Layer B is then decoded, and the luminance and transmittance signals are stored to the frame memory FM0 14 and frame memory FM3 42. Using the transmittance signal (image 1004) stored in frame memory FM4 44, the image synthesizer 16 combines the luminance signals from frame memory FM0 14 and frame memory FM1 22. If x0 is the pixel value from the frame memory FM0 14, x1 is the pixel value from the frame memory FM1 22, and $\alpha$ is the value from the frame memory FM4 44, x1 is placed over x0, and the output pixel Y from the image synthesizer 16 can be obtained from the equation $$y=\alpha* x1+(1-\alpha)*x0.$$

Transmittance signal B' 1005 (FIG. 17B) is stored to the frame memory FM3 42, and is merged with the transmittance signal 1004 from the frame memory FM4 44 by the image synthesizer 46. The transmittance signals from the two frame memories FM3 42 and FM4 44 are preferably compared, and the signal with the higher signal value is output. The transmittance signals thus synthesized are shown as image D' 1006 in FIG. 17B.

The luminance and transmittance signals for layer C are decoded next, and merged with layers A and B as described above.

Note that a selective display capability can be provided in the apparatus shown in FIG. 17B by adding switches and frame memory as shown in FIGS. 13, 14, and 15 and described above.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image predictive coding method for coding a target image by obtaining a predictive image from a reference image including an object image comprising a luminance signal indicating a pixel value and a shape signal indicating whether a pixel is located inside or outside the object image, said method comprising:

dividing the target image into a plurality of target subareas;

obtaining a substitute pixel value for a pixel located outside the object image, which is determined according to the shape signal, in a subarea of the reference image by using a pixel value of a pixel located inside the object image, which is determined according to the shape signal, in the subarea of the reference image;

generating a padded predictive subarea by padding the pixel located outside the object image with the substitute pixel value; and obtaining and coding a pixel value difference between the target subarea and the padded predictive subarea.

2. An image predictive coding method according to claim 1, wherein the substitute pixel value is an average of pixel values of pixels located inside the object image, which is determined according to the shape signal.

3. An image predictive coding apparatus for coding a target image by obtaining a predictive image from a reference image including an object image comprising a luminance signal indicating a pixel value and a shape signal indicating whether a pixel is located inside or outside the object image, said apparatus comprising:

a device operable to divide the target image into a plurality of target subareas;

a device operable to obtain a substitute pixel value for a pixel located outside the object image, which is determined according to the shape signal, in a subarea of the reference image by using a pixel value of a pixel located inside the object image, which is determined according to the shape signal, in the subarea of the reference image;

a device operable to generate a padded predictive subarea by padding the pixel located outside the object image with the substitute pixel value; and a device operable to obtain and code a pixel value difference between one of the target subareas and the padded predictive subarea.

4. An image predictive coding apparatus according to claim 3, wherein the substitute pixel value is an average of pixel values of pixels located inside the object image, which is determined according to the shape signal.

5. An image predictive coding method for coding a target image by obtaining a predictive image from a reference image including an object image comprising a luminance signal indicating a pixel value and a shape signal indicating whether a pixel is located inside or outside the object image, said method comprising:

dividing the target image into a plurality of target subareas;

determining, according to the shape signal, whether each pixel included in a subarea of the reference image is an inside pixel located inside the object image or an outside pixel located outside the object image, the subarea of the reference image including both the outside pixel and the inside pixel;

obtaining a substitute pixel value for the outside pixel included in the subarea of the reference image by using a pixel value of the inside pixel included in the subarea of the reference image;

generating a padded predictive subarea by padding the outside pixel located outside the object image with the substitute pixel value; and obtaining and coding a pixel value difference between the target subarea and the padded predictive subarea.

* * * * *